US012535799B2

(12) United States Patent
Moradian et al.

(10) Patent No.: US 12,535,799 B2
(45) Date of Patent: Jan. 27, 2026

(54) SUSTAINABILITY MONITORING PLATFORM WITH SENSOR SUPPORT

(71) Applicant: Applied Materials, Inc., Santa Clara, CA (US)

(72) Inventors: Ala Moradian, San Jose, CA (US); Aleksey Yanovich, Campbell, CA (US); Orlando Trejo, Santa Clara, CA (US); Elizabeth Neville, Sunnyvale, CA (US); Dinesh Saigal, San Jose, CA (US); Umesh Madhav Kelkar, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 519 days.

(21) Appl. No.: 17/981,305

(22) Filed: Nov. 4, 2022

(65) Prior Publication Data

US 2024/0012393 A1    Jan. 11, 2024

Related U.S. Application Data

(60) Provisional application No. 63/359,646, filed on Jul. 8, 2022.

(51) Int. Cl.
*G05B 19/41* (2006.01)
*G05B 19/418* (2006.01)

(52) U.S. Cl.
CPC ............ *G05B 19/4184* (2013.01); *G05B 2219/45031* (2013.01)

(58) Field of Classification Search
CPC ...... G05B 19/4184; G05B 2219/45031; G05B 19/4065; C23C 14/54; C23C 16/52;

(Continued)

(56) References Cited

U.S. PATENT DOCUMENTS 10,529,603 B2    1/2020  Liang
2007/0238199 A1*  10/2007  Yamashita .......... C23C 16/4404
                                            257/E21.311

(Continued)

FOREIGN PATENT DOCUMENTS

KR    102022496 B1    9/2019

OTHER PUBLICATIONS

International Search Report and Written Opinion of International application No. PCT/US2023/026631 dated Oct. 23, 2023; 10 pages.

*Primary Examiner* — Christopher W Carter
(74) *Attorney, Agent, or Firm* — Lowenstein Sandler LLP

(57) ABSTRACT

In embodiments, a method includes receiving, by a processing device, first sensor data generated by a plurality of sensors of a process chamber of a manufacturing system during execution of a fabrication process. The method includes receiving, by the processing device, second sensor data generated by one or more external sensors that are not components of the process chamber during execution of the fabrication process. The method includes determining, by the processing device, environmental resource usage data indicative of an environmental resource consumption of the fabrication process run on the process chamber based on the first sensor data and the second sensor data. The method includes providing, by the processing device, the environmental resource usage data for display on a graphical user interface (GUI).

21 Claims, 13 Drawing Sheets

(58) Field of Classification Search
CPC ........ G06N 3/084; G06N 3/09; G06N 3/0442; G06N 3/0464; G06N 3/088; G06N 3/092; G06N 20/00; H01L 21/67253; H01L 21/67248; G16Y 10/25; G16Y 40/10
See application file for complete search history.

(56) References Cited

U.S. PATENT DOCUMENTS

| | | | |
|---|---|---|---|
| 2015/0253762 A1* | 9/2015 | Nakano | G05B 19/418 700/121 |
| 2016/0307116 A1 | 10/2016 | Kaushal | |
| 2017/0308071 A1 | 10/2017 | Denome | |
| 2020/0310526 A1 | 10/2020 | de Beus | |
| 2022/0114484 A1* | 4/2022 | Hanada | C23C 16/50 |
| 2022/0291035 A1* | 9/2022 | Asakawa | G06Q 10/063 |
| 2022/0404785 A1* | 12/2022 | Gahan | H01J 37/32183 |
| 2024/0378347 A1* | 11/2024 | Roham | G06F 30/17 |

* cited by examiner

SUSTAINABILITY MONITORING PLATFORM WITH SENSOR SUPPORT

RELATED APPLICATIONS

This application claims the benefit under 35 U.S.C. § 119(e) of U.S. Provisional Application No. 63/359,646, filed Jul. 8, 2022, the entire content of which is incorporated by reference herein.

TECHNICAL FIELD

The instant specification generally relates to environmental impact of manufacturing equipment such as semiconductor manufacturing equipment. More specifically, the instant specification relates to monitoring ecological efficiency (eco-efficiency) of manufacturing processes and manufacturing equipment using sensors of the manufacturing equipment and external sensors that are not part of the manufacturing equipment.

BACKGROUND

The continued demand for electronic devices calls for an increasingly larger demand for semiconductor wafers. The increase in manufacturing to produce these wafers takes a substantial toll on the environment in the form of resource utilization and the creation of environmentally damaging waste. Thus, there is an increased demand for more ecologically-friendly and environmentally responsible methods of wafer manufacture and of manufacturing in general. Given that wafer processing is energy intensive, there is value in decoupling the semiconductor industry's growth from its environmental impact. Growing chip demand and increasing chip complexity is increasing the environmentally impacting resource consumption.

SUMMARY

The following is a simplified summary of the disclosure in order to provide a basic understanding of some aspects of the disclosure. This summary is not an extensive overview of the disclosure. It is not intended to delineate any scope of the particular implementations of the disclosure or any scope of the claims. Its sole purpose is to present some concepts of the disclosure in a simplified form as a prelude to the more detailed description that is presented later.

Technologies directed to an eco-efficiency monitoring and exploration platform for semiconductor manufacturing are described. In some embodiments, a method comprises: receiving, by a processing device, first sensor data generated by a plurality of sensors of a process chamber of a manufacturing system during execution of a fabrication process; receiving, by the processing device, second sensor data generated by one or more external sensors that are not components of the process chamber during execution of the fabrication process; determining, by the processing device, environmental resource usage data indicative of an environmental resource consumption of the fabrication process run on the process chamber based on the first sensor data and the second sensor data; and providing, by the processing device, the environmental resource usage data for display on a graphical user interface (GUI). As used herein, environmental resource usage data may include data on consumption of resources and/or chemicals, environmental impact of resource(s) and/or chemical(s) used/consumed, energy consumption, and/or environmental impact of energy consumed.

In some embodiments, a system, comprises a manufacturing system, comprising: one or more process chambers to process substrates, the one or more process chambers comprising a first plurality of sensors; a transfer chamber coupled to the one or more process chambers, the transfer chamber comprising a robot for transferring the substrates to and from the one or more process chambers; and a system controller to control the one or more process chambers and the transfer chamber. The system further comprises a second plurality of sensors, wherein the second plurality of sensors are external sensors that are not components of any of the one or more process chambers; and a hub that communicates with the second plurality of sensors. The system controller is configured to perform the following: receive first sensor data generated by the first plurality of sensors during execution of a fabrication process on a first process chamber of the one or more process chambers; receive second sensor data generated by the second plurality of sensors that are associated with the first process chamber; determine environmental resource usage data indicative of an environmental resource consumption of the fabrication process run on the first process chamber based on applying the first sensor data and the second sensor data to one or more model; and provide the environmental resource usage data for display on a graphical user interface (GUI).

In some embodiments, a non-transitory machine-readable storage medium comprises instructions that, when executed by a processing device, cause the processing device to: receive, by the processing device, first sensor data generated by a plurality of sensors of a process chamber of a manufacturing system during execution of a fabrication process; receive, by the processing device, second sensor data generated by one or more external sensors that are not components of the process chamber during execution of the fabrication process; determine, by the processing device, environmental resource usage data indicative of an environmental resource consumption of the fabrication process run on the process chamber based on the first sensor data and the second sensor data; and provide, by the processing device, the environmental resource usage data for display on a graphical user interface (GUI).

BRIEF DESCRIPTION OF THE DRAWINGS

Aspects and implementations of the present disclosure will be understood more fully from the detailed description given below and from the accompanying drawings, which are intended to illustrate aspects and implementations by way of example and not limitation.

DETAILED DESCRIPTION

Figure 1:
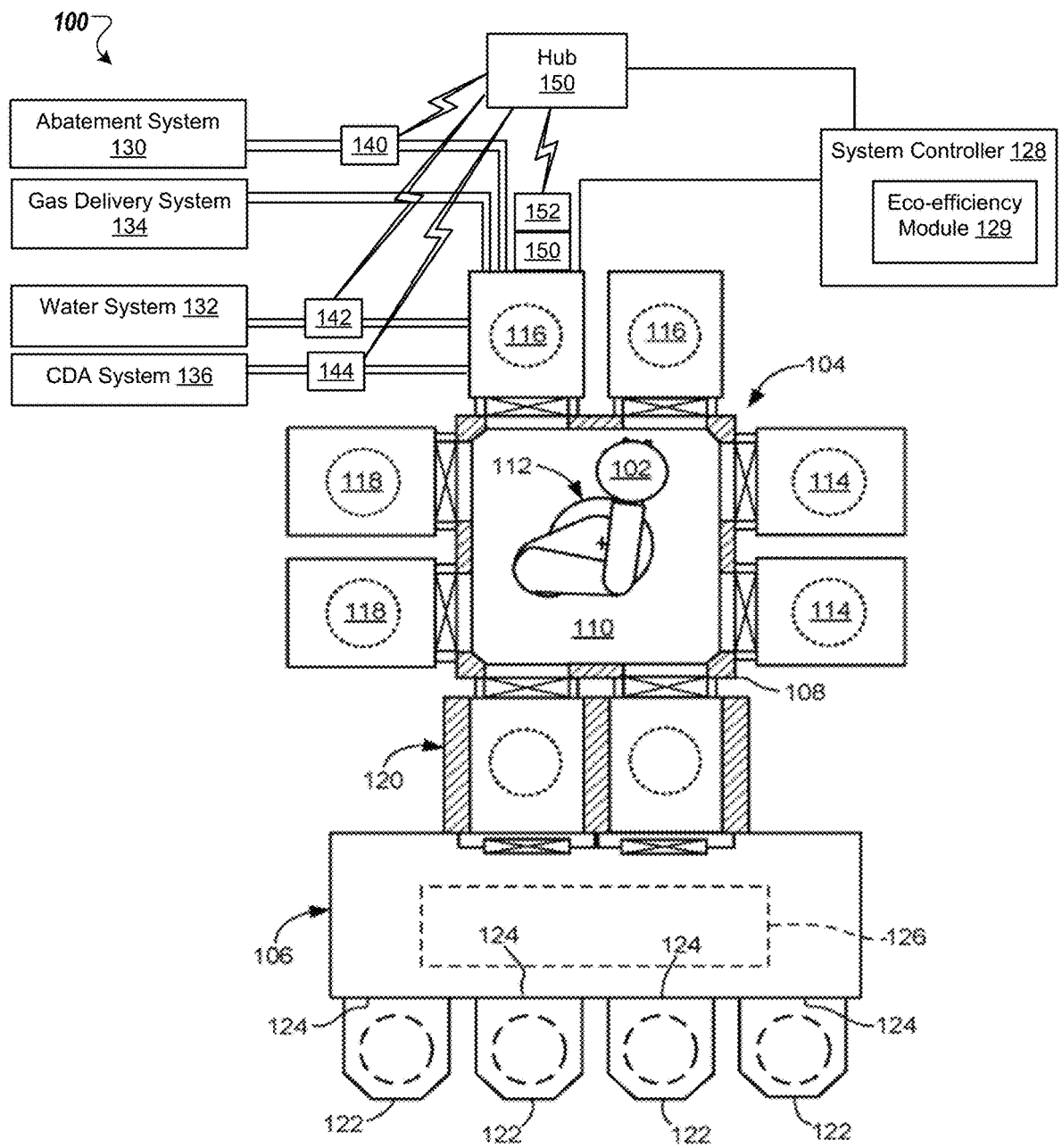
FIG. 1 is a top schematic view of an example manufacturing system, according to one embodiment.

Ecological-efficiency (eco-efficiency) characterization is a complex technique used to determine how different levels of inputs (e.g., resources, utilization, etc.) associated with a particular manufacturing tool during use of the tool impact eco-efficiency of the manufacturing tool. Eco-efficiency characterization may be beneficial during development of a manufacturing tool to help develop manufacturing tools that maximize a per-unit (or per-time) eco-efficiency and minimize harmful environmental impact. Eco-efficiency characterization may also be beneficial after tool development, while the tool is operational, to fine tune the per-unit eco-efficiency characteristics of the tool in view of the specific parameters according to which the tool is operating.

Embodiments described herein provide a system for systematically performing eco-efficiency characterization of a manufacturing tool throughout the design, development, and deployment of that tool. In some embodiments, an eco-efficiency platform is capable of assisting engineering in developing and/or operating processes and tools that meet both material engineering and eco-efficiency specifications. In embodiments, sensor data, physics, models, algorithms, and/or a user interface (UI) are leveraged to provide flexibility and ease of monitoring and exploring the eco-efficiency of numerous manufacturing systems and individual process chambers of those manufacturing systems. Additionally, the eco-efficiency platform may enable the monitoring and exploring of process recipes and fabrication hardware configurations. Embodiments further provide using eco-efficiency characterization with a digital replica associated with a manufacturing process and/or manufacturing equipment to further determine environmental resource consumption and/or environmental impact (e.g., per-unit device, die, wafer, etc.) and/or to reduce environmental resource consumption and/or environmental impact. Embodiments further provide a platform for exploring manufacturing system modification and resulting eco-efficiency impact using a digital replica (e.g., without requiring physical testing and empirical results).

In embodiments, an eco-efficiency platform receives two general categories of sensor data, including first sensor data from sensors included in process chambers and second sensor data from external sensors that are not components of (e.g., not included in) process chambers. In embodiments, the first sensor data and second sensor data are received in parallel (e.g., at around the same time). In some embodiments, the first sensor data and second sensor data are received at different times (e.g., in series or consecutively). External sensors may be, for example, internet-of-things (IoT) sensors that may be wireless and/or that may not be connected to any power source. The external sensors may report sensor data to a hub (e.g., an IoT hub), which may then send the sensor data to a system controller of a manufacturing system that includes a process chamber for which data is being gathered. The system controller may include software (e.g., the eco-efficiency platform), which may input the first and second sensor data into one or more models. The one or more models may include trained machine learning models, physics-based models (e.g., digital twins) and/or other models. The one or more models may output environmental resource usage data indicative of environmental resource consumption (e.g., consumption of chemicals, gases, power, water, and so on). As used herein, environmental resource usage data may include data on consumption of resources and/or chemicals, environmental impact of resource(s) and/or chemical(s) used/consumed, energy consumption, and/or environmental impact of energy consumed.

In some embodiments, eco-efficiency is calculated on a per-unit basis. Typically, per-unit eco-efficiency is not taken into account in the manufacturing tool development process. Additionally, it can be a cumbersome and complicated process to characterize per-unit eco-efficiency to adjust settings on a manufacturing tool while that tool is in use (e.g., while a tool is used for wafer production). Furthermore, prior solutions used special eco-efficiency training of people and specialized engineers and analysts for eco-efficiency characterization analysis. Embodiments of the present disclosure provide improved methods, systems and software for eco-efficiency characterization on a per-unit basis. These methods, systems and software may be used by individuals who have not received special eco-efficiency training.

In one embodiment, eco-efficiency characterization may be performed by a software tool in all stages of a manufacturing equipment lifecycle, including during the design stages and the operational stages of manufacturing equipment. Eco-efficiency may include the amount of environmental resource (e.g., electrical energy, water, gas, chemical, etc.) consumed per-unit of equipment production (e.g., per wafer, or per device manufactured). Eco-efficiency may also be characterized as the amount of environmental impact (e.g., $CO_2$ emissions, heavy metal waste, etc.) generated per-unit of equipment production.

Per-unit analysis, where a unit is any measurable quantity (e.g., a substrate (wafer), die, area ($cm^2$), time period, device, etc.) operated on by a manufacturing tool, allows for more precise characterizations of eco-efficiency. Eco-efficiency on a "per-unit" basis allows for an accurate determination of resource usage and environmental impact per-unit produced, and can be easily manipulated as a measure of value. For example, it may be determined that a particular manufacturing tool has an electrical energy per-wafer-pass eco-efficiency rating of 1.0-2.0 kWh per-wafer-pass (in other embodiments eco-efficiency ratings may be less than 0.5 kWh, up to 20 kWh, or even greater than 20 kWh per-wafer-pass), indicating that each wafer operated on by the manufacturing tool may use, for example, 1.0-2.0 kWh of electrical energy per wafer processed. In other embodiments various other amounts of electrical energy may be used. Determining eco-efficiency on a per-wafer-pass basis allows for easy comparison with other manufacturing tools that have a different yearly electrical energy consumption value due to variance in yearly wafer throughput. In one embodiment, eco-efficiency may also be determined on a per-device basis by dividing a per-wafer eco-efficiency characterization by the number of devices per wafer.

Eco-efficiency characterization or calculation may be performed on manufacturing equipment during operation. The manufacturing equipment may access real-time variables, such as utilization and utility use data of the equipment from first sensors on the manufacturing equipment and second sensors that are external sensors and that are not components of the manufacturing equipment, and use the real-time variables in one or more eco-efficiency model. Manufacturing equipment may fine-tune settings on the equipment to maximize eco-efficiency in view of the current operating conditions of the manufacturing equipment.

In some embodiments, a modification to a fabrication process (e.g., a subset of the process or multiple processes) may be determined based on environmental resource usage data or eco-efficiency characterization. For example, environmental resource usage data may be used as input to a machine learning model. One or more output from the machine learning model may be obtained that are indicative of the modification to the fabrication process and in some embodiments a level of confidence that the modification meets a threshold condition. The modification to the fabrication process may be associated with improving an eco-efficiency of a selection of a manufacturing process (e.g., reducing an environmental resource consumption and/or environmental impact).

In some embodiments, the compliance reports may include reporting based on the generally accepted codes and/or standards such as Semiconductor Equipment and Materials International (SEMI) published in the semiconductor facility systems guideline (SEMI S23-0813) for energy, electricity, and production conservation for semiconductor manufacturing equipment. For example, SEMI S23-0813 provides the energy conversions factors (ECFs) (e.g., energy consumption per unit flow rate) of important utilities. The ECFs may estimate the energy consumption of utilities and is used to estimate energy savings at semiconductor fabrication facilities.

In some embodiments, eco-efficiency is based on resource consumption such as energy consumption, chemical consumption (e.g., gases such as hydrogen, nitrogen, chemicals used for etching or deposition of thin films and/or liquids that can be vaporized, atomized, or converted to a gaseous state via a bubbler, injector or atomizer), CDA (clean dry air)), and/or water consumption (such as process cooling water (PCW), de-ionized water (DIW), and ultrapure water (UPW), for example. However in some embodiments, the eco-efficiency is based on life-cycle data of a component associated with the manufacturing equipment. For example, an environmental resource consumption and/or environmental impact associated with the eco-efficiency characterization may be associated with a replacement procedure or an upkeep procedure of a consumable part of the manufacturing equipment. The modification may be associated with the upkeep procedure of the consumable part of the manufacturing equipment. Some embodiments are discussed herein with reference to consumption of gases. However, it should be understood that such embodiments also apply to consumption of chemicals having other states, such as chemicals in a liquid state. Any embodiments discussed herein with reference to gas consumption equally apply to consumption of other types of chemicals, such as liquids.

As described above, in embodiments an eco-efficiency platform determines environmental resource usage of a process chamber that executes a fabrication process based on first sensor data from a first set of sensors that are integral to a process chamber and second sensor data from a second set of sensors that are not integral to the process chamber. The second set of sensors may provide data on resource consumption that generally is not measured for process chambers, and which the process chambers are not configured to measure, such as an amount of clean dry air (CDA), electricity and/or water used by a manufacturing system for pumps and/or abatement systems in association with a fabrication process being executed on a process chamber. By adding external sensors that can measure such parameters, the amount of resources used for a process executed on a process chamber can be more accurately determined. The improved accuracy of the eco-efficiency platform that uses such data can result in better process development and lower overall resource consumption in embodiments.

FIG. 1 is a top schematic view of an example processing system 100 (also referred to herein as a manufacturing system), according to one embodiment. In some embodiments, processing system 100 may be an electronics processing system configured to perform one or more processes on a substrate 102. In some embodiments, processing system 100 may be an electronics device manufacturing system. Substrate 102 can be any suitably rigid, fixed-dimension, planar article, such as, e.g., a silicon-containing disc or wafer, a patterned wafer, a glass plate, or the like, suitable for fabricating electronic devices or circuit components thereon. In some embodiments, processing system 100 is a semiconductor processing system. Alternatively, processing system 100 may be configured to process other types of devices, such as display devices.

Processing system 100 includes a process tool 104 (e.g., a mainframe) and a factory interface 106 coupled to process tool 104. Process tool 104 includes a housing 108 having a transfer chamber 110 therein. Transfer chamber 110 includes one or more processing chambers (also referred to as process chambers) 114, 116, 118 disposed therearound and coupled thereto. Processing chambers 114, 116, 118 can be coupled to transfer chamber 110 through respective ports, such as slit valves or the like.

Processing chambers 114, 116, 118 can be adapted to carry out any number of processes on substrates 102. A same or different substrate process can take place in each processing chamber 114, 116, 118. Examples of substrate processes include atomic layer deposition (ALD), physical vapor deposition (PVD), chemical vapor deposition (CVD), etching, annealing, curing, pre-cleaning, metal or metal oxide removal, or the like. In one example, a PVD process is performed in one or both of process chambers 114, an etching process is performed in one or both of process chambers 116, and an annealing process is performed in one or both of process chambers 118. Other processes can be carried out on substrates therein. Processing chambers 114, 116, 118 can each include a substrate support assembly. The substrate support assembly can be configured to hold a substrate in place while a substrate process is performed.

Transfer chamber 110 also includes a transfer chamber robot 112. Transfer chamber robot 112 can include one or multiple arms, where each arm includes one or more end effectors at the end of the arm. The end effector can be configured to handle particular objects, such as wafers. In some embodiments, transfer chamber robot 112 is a selective compliance assembly robot arm (SCARA) robot, such as a 2 link SCARA robot, a 3 link SCARA robot, a 4 link SCARA robot, and so on.

A load lock 120 can also be coupled to housing 108 and transfer chamber 110. Load lock 120 can be configured to interface with, and be coupled to, transfer chamber 110 on one side and factory interface 106 on another side. Load lock 120 can have an environmentally-controlled atmosphere that is changed from a vacuum environment (where substrates are transferred to and from transfer chamber 110) to at or near an atmospheric-pressure inert-gas environment (where substrates are transferred to and from factory interface 106) in some embodiments. In some embodiments, load lock 120 is a stacked load lock having a pair of upper interior chambers and a pair of lower interior chambers that are located at different vertical levels (e.g., one above another). In some embodiments, the pair of upper interior chambers are configured to receive processed substrates from transfer chamber 110 for removal from process tool 104, while the pair of lower interior chambers are configured to receive substrates from factory interface 106 for processing in process tool 104. In some embodiments, load lock 120 are configured to perform a substrate process (e.g., an etch or a pre-clean) on one or more substrates 102 received therein.

Factory interface 106 can be any suitable enclosure, such as, e.g., an Equipment Front End Module (EFEM). Factory interface 106 can be configured to receive substrates 102 from substrate carriers 122 (e.g., Front Opening Unified Pods (FOUPs)) docked at various load ports 124 of factory interface 106. A factory interface robot 126 (shown dotted) can be configured to transfer substrates 102 between substrate carriers 122 (also referred to as containers) and load lock 120. In other and/or similar embodiments, factory interface 106 is configured to receive replacement parts from replacement parts storage containers 123. Factory interface robot 126 can include one or more robot arms and can be or include a SCARA robot. In some embodiments, factory interface robot 126 has more links and/or more degrees of freedom than transfer chamber robot 112. Factory interface robot 126 can include an end effector on an end of each robot arm. The end effector can be configured to pick up and handle specific objects, such as wafers. Alternatively, or additionally, the end effector can be configured to handle objects such as process kit rings.

Any conventional robot type can be used for factory interface robot 126. Transfers can be carried out in any order or direction. Factory interface 106 can be maintained in, e.g., a slightly positive-pressure non-reactive gas environment (using, e.g., nitrogen as the non-reactive gas) in some embodiments.

Processing system 100 can also include a system controller 128. System controller 128 can be and/or include a computing device such as a personal computer, a server computer, a programmable logic controller (PLC), a microcontroller, and so on. System controller 128 can include one or more processing devices, which can be general-purpose processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like. System controller 128 can include a data storage device (e.g., one or more disk drives and/or solid state drives), a main memory, a static memory, a network interface, and/or other components. System controller 128 can execute instructions to perform any one or more of the methodologies and/or embodiments described herein. The instructions can be stored on a computer readable storage medium, which can include the main memory, static memory, secondary storage and/or processing device (during execution of the instructions). In embodiments, execution of the instructions by system controller 128 causes system controller to perform the method of FIG. 8. System controller 128 can also be configured to permit entry and display of data, operating commands, and the like by a human operator.

In embodiments, system controller 128 includes an eco-efficiency module 129, which may be a local server that executes on the system controller 128 of the processing system 100. The eco-efficiency module 129 may be responsible for processing first sensor data generated by sensors of one or more processing chambers 114, 116, 118 as well as second sensor data from additional sensors 140, 142, 144 that are external to the processing chamber 114, 116, 118. The first sensor data may be generated by sensors that are integral to the processing chamber 114, 116, 118. Such sensors may include, for example, temperature sensors, power sensors, current sensors, pressure sensors, concentration sensors, and so on. The first sensor data output by the integral sensors of the processing chambers 114, 116, 118 may include measurements of current, voltage, power, flow (e.g., of one or more gases, CDA, water, etc.), pressure, concentration (e.g., of one or more gases), speed (e.g., of one or more moving parts, of gases, etc.), acceleration (e.g., of one or more moving parts, of gases, etc.), or temperature (e.g., of a substrate under process, of different locations in a processing chamber, and so on). In one embodiment, each chamber includes between about 20 to about 100 sensors.

In order to capture additional data not generally accessible by the integral sensors of the processing chambers 114, 116, 118, one or more external sensors 140, 142, 144, 152 may be attached to the processing chambers 114, 116, 118 and/or to feed lines into and/or out of the processing chambers 114, 116, 118 and/or to sub-components that operate for the benefit of the processing chambers 114, 116, 118 (e.g., such as pumps and/or abatement systems). In one embodiment, each process chamber includes about 3-6 external sensors attached to the process chamber, sub-systems associated with the process chamber, and/or inputs/outputs to and from the process chamber. The second sensor data output by the external sensors 140, 142, 144, 152 may include, for example, current, flow, temperature, eddy current, concentration, vibration, voltage, or power factor. Examples of external sensors 140, 142, 144, 152 that may be used include clamp sensors that measure AC current or DC current (also referred to as a current clamp), clamp sensors that measure voltage, and clamp sensors that measure leakage current. Other examples of external sensors are vibration sensors, temperature sensors, ultrasonic sensors (e.g., ultrasonic flow sensors), accelerometers (i.e., acceleration sensors), etc.

In the example shown, an abatement system 130, a gas delivery system 134, a water system 132 and/or a CDA system 136 may provide environmental resources to the processing chambers 114, 116, 118 and/or to other components of the processing system 100 (e.g., to the transfer chamber, factory interface, load locks, etc.). In embodiments, the abatement system 130 performs abatement for residual gases, reactants and/or outputs associated with a process executed on a processing chamber 114, 116, 118. The abatement system 130 may burn residual gases and/or reactants, for example, to ensure that they do not pose an environmental risk. Additionally, in embodiments one or more pumps 150 may be attached to and/or operate on behalf of one or more of the processing chambers 114, 116, 118.

External sensors 140, 142, 144, 152 are shown with relation to a single processing chamber 116 as a simplification for the sake of clarity. However, it should be understood that similar external sensors may be attached on additional process chambers and/or on lines to and/or from such additional process chambers and/or to sub-systems associated with such additional process chambers.

The external sensors 140, 142, 144, 152 may be IoT sensors in some embodiments. In some embodiments, the external sensors include a power source such as a battery. In some embodiments, the external sensors are wired sensors that are plugged into a power source such as an AC power outlet. In some embodiments, the external sensors do not include a power source, and instead receive sufficient power to operate based on environmental conditions. For example, a sensor that detects voltage, power and/or current may be wirelessly powered by such power or current (e.g., by harvesting energy from current that runs through a wire that a sensor is clamped over).

In one embodiment, the external sensors 140, 142, 144, 152 are sensors having embedded systems. An embedded system is a class of computing device that is embedded into another device as one component of the device. The external sensors 140, 142, 144, 152 typically also include other hardware, electrical and/or mechanical components that may interface with the embedded system. Embedded systems are typically configured to handle a particular task or set of tasks, for which the embedded systems may be optimized (e.g., generating and/or sending measurements). Accordingly, the embedded systems may have a minimal cost and size as compared to general computing devices.

The embedded systems may each include a communication module (not shown) that enables the embedded system (and thus the external sensor 140, 142, 144, 152) to connect to a LAN, to a hub 150, and/or or to a wireless carrier network (e.g., that is implemented using various data processing equipment, communication towers, etc.). The communication module may be configured to manage security, manage sessions, manage access control, manage communications with external devices, and so forth.

In one embodiment, the communication module of the external sensors 140, 142, 144, 152 is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evolution (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

In one embodiment, the communication module is configured to communicate with hub 150, which may be, for example, a Wi-Fi router or other type of router, switch or hub. The hub 150 may be configured to communicate with the communication module of each of the external sensors 140, 142, 144, 152, and to send measurements received from the external sensors 140, 142, 144, 152 to system controller 128. In one embodiment, hub 150 has a wired connection (e.g., an Ethernet connection, a parallel connection, a serial connection, Modbus connection, etc.) to the system controller 128, and sends the measurements to the system controller 128 over the wired connection. In one embodiment, the hub 150 is connected to one or more external sensors via a wired connection.

In some embodiments, hub 150 is connected to a network device that is connected to a local area network (LAN). The system controller 128 and the network device may each be connected to the LAN via a wireless connection, and through the LAN may be wirelessly connected to one another. External sensors 140, 142, 144, 152 may not support any of the communication types supported by the network device. For example, external sensor 140 may support Zigbee, and external sensor 142 may support Bluetooth. To enable such devices to connect to the LAN, the hub 150 may act as a gateway device connected to the network device (not shown) via one of the connection types supported by the network device (e.g., via Ethernet or Wi-Fi). The gateway device may additionally support other communication protocols such as Zigbee, PLC and/or Bluetooth, and may translate between supported communication protocols.

The system controller 128 may be connected to a wide area network (WAN). The WAN may be a private WAN (e.g., an intranet) or a public WAN such as the Internet, or may include a combination of a private and public network. In embodiments, the system controller 128 may be connected to a LAN that may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN.

The WAN may include or connect to one or more server computing devices (not shown). The server computing devices may include physical machines and/or virtual machines hosted by physical machines. The physical machines may be rackmount servers, desktop computers, or other computing devices. In one embodiment, the server computing devices include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device may host one or more services, which may be a web based service and/or a cloud service (e.g., a web based service hosted in a cloud computing platform). The service may maintain a session (e.g., via a continuous or intermittent connection) with the system controller 128 and/or system controllers of other manufacturing systems at a same location (e.g., in a fabrication facility or fab) and/or at different locations. Alternatively, the service may periodically establish sessions with the system controllers. Via a session with a system controller 128, the service may receive status updates from the eco-efficiency module 129 running on the system controller 128. The service may aggregate the data, and may provide a graphical user interface (GUI) that is accessible via any device (e.g., a mobile phone, tablet computer, laptop computer, desktop computer, etc.) connected to the WAN.

Eco-efficiency module 129 that executes on system controller 128 may process the first sensor data from the integral sensors of one or more process chambers 114, 116, 118 and second sensor data from external sensors 140, 142, 144, 152 to determine environmental resource usage data that reflects amounts of environmental resource consumption, such as water consumption, consumption of gases, electricity consumption, and so on. Operations that may be performed by the eco-efficiency module 129 are described below with reference to the remaining figures.

In some embodiments, sensor data from one or more external sensors may be used to assess the health of a process chamber or sub-component of a process chamber (e.g., of a pump). Sensor data from one or more external sensors may be compared to one or more criteria (e.g., thresholds), and if the sensor data fails to satisfy the criteria, a determination may be made that the tool or sub-component is not operating reliably. For example, a vibration sensor may sense vibrations of a pump. If the vibrations exceed a vibration threshold, then a determination may be made that the pump may be starting to fail or may have problems. If first sensor data for a sub-component or tool fails to satisfy one or more criteria, then environmental resource consumption calculations associated with that sub-component or tool may be determined to have a low confidence. For example, if a pump has increased vibration, then the pump may be consuming more power than typical, and models on power consumption of the pump may be inaccurate for the present state of the pump. Accordingly, sensor data from external sensors and/or internal sensors of process chambers may be used to perform health assessments of the process chamber and/or one or more sub-components of the process chamber.

Figure 2:
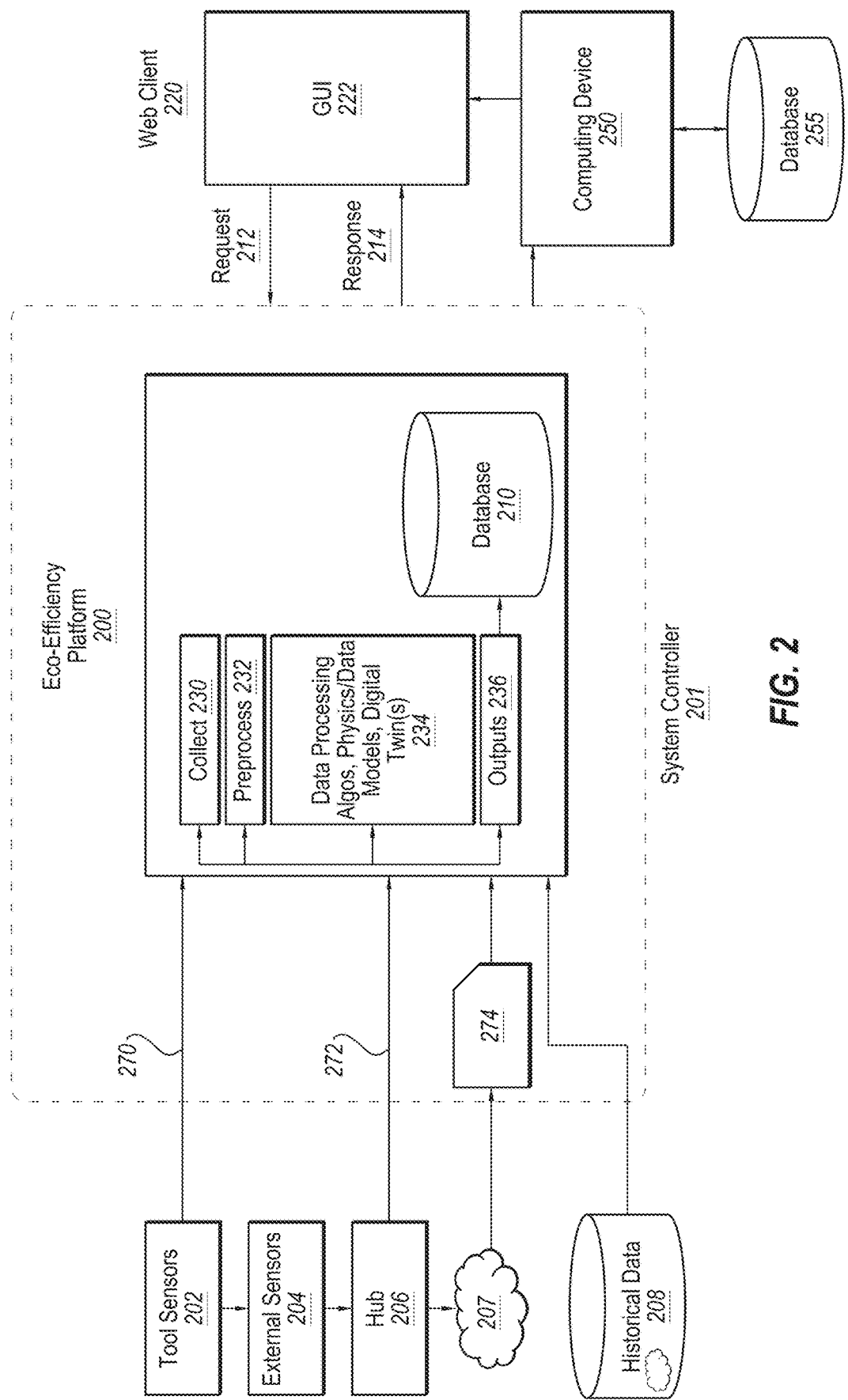
FIG. 2 is a block diagram illustrating a logical view of an exemplary eco-efficiency platform, according to one embodiment.

FIG. 2 is a block diagram illustrating a logical view of an exemplary eco-efficiency platform 200, according to one embodiment. The eco-efficiency platform 200 may execute on a system controller 201 in embodiments. In one embodiment, system controller 201 corresponds to system controller 128 of FIG. 1, and eco-efficiency platform 200 is provided by eco-efficiency module 129 of FIG. 1.

The eco-efficiency platform 200 may receive first sensor data 270 from tool sensors 202, which may be integral sensors of process chambers 114, 116, 118 of FIG. 1 in embodiments. Eco-efficiency platform 200 may additionally receive second sensor data 272 from a hub 206, where the hub 206 receives the second sensor data from one or more external sensors 204. The external sensors 204 may correspond to external sensors 140, 142, 144, 152 of FIG. 1 in embodiments. In some embodiments, hub 206 provides the second sensor data to a server 207, which may execute on one or more computing device (e.g., in a cloud environment). The server (e.g., an IoT platform) 207 may aggregate the second sensor data into aggregated second sensor data 274, and may send the aggregated second sensor data 274 to eco-efficiency platform 200. Such aggregated second sensor data 274 may be provided to the eco-efficiency platform 200 instead of or in addition to second sensor data 272.

In some embodiments, historical data 208 (e.g., historical sensor data) may be stored in a data store such as a database. Such historical data 208 may additionally be provided to eco-efficiency platform 200 in some embodiments.

At block 230, the eco-efficiency platform 200 collects the first sensor data 270, second sensor data 272, aggregated second sensor data 274 and/or historical data 208. At block 232, the eco-efficiency platform 200 may preprocess some or all of the received data. The preprocessing may include normalizing data, changing units of data, adding timestamps to data, synchronizing data based on time stamps, adding labels to data, and so on.

At block 234, the eco-efficiency platform 200 performs data processing on the received data (e.g., first sensor data 270 and second sensor data 272). This may include inputting the data into one or more data processing algorithms or functions, inputting the data into one or more physics-based models (e.g., such as digital twins), inputting the data into one or more trained machine learning models, and so on. At block 236, outputs are generated by the one or more models, data processing algorithms, functions, etc. The outputs may include physical conditions associated with a fabrication process executed on a process chamber and/or environmental resource usage data. The outputs may be stored in a local data store such as a database 210.

A client computing device executing a web client 220 or other client application that includes a graphical user interface (GUI) 222 or other type of user interface may interface with the eco-efficiency platform 200. The web client 220 may send requests 212 to the eco-efficiency platform 200 and receive responses 214. The requests 212 may include, for example, requests for environmental resource usage data for one or more process chambers, for a manufacturing system that includes multiple process chambers, for recipes that execute on the process chambers, and so on. The requests may include requests to present the environmental resource usage data in charts, tables, and so on.

In some embodiments, eco-efficiency platforms 200 of multiple system controllers 201 interface with a remote computing device 250 (e.g., via a WAN). The remote computing device 250 may include a remote server that aggregates data from multiple eco-efficiency platforms and stores the aggregated data in a data store such as database 255. The web client 220 (or other client application) may interface with the remote server of computing device 250 to access environmental resource usage data for multiple manufacturing systems in a fab, for multiple fabs, and so on.

Figure 3:
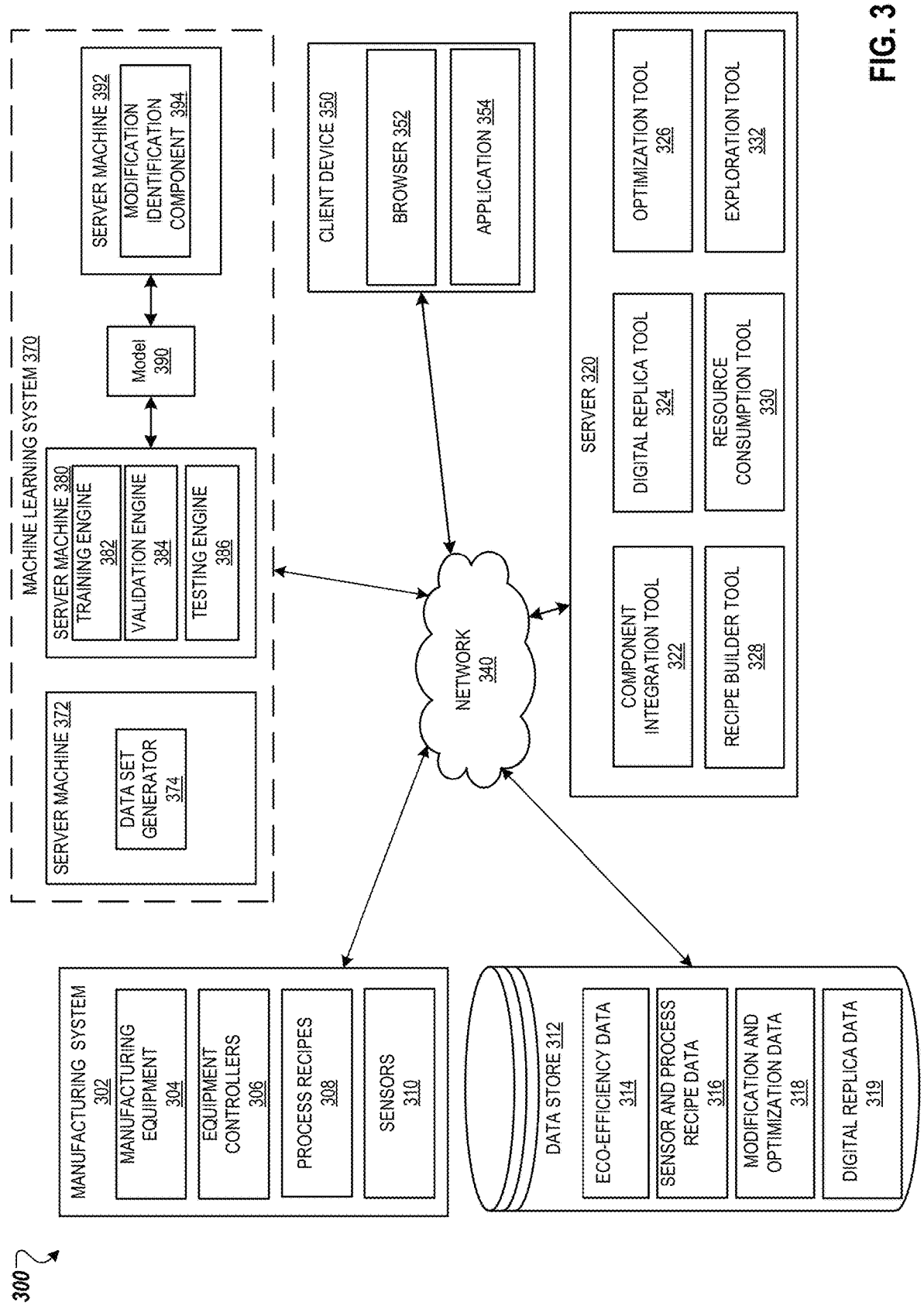
FIG. 3 is a block diagram illustrating an exemplary system architecture in which implementations of the disclosure may operate.

FIG. 3 is a block diagram illustrating an exemplary system architecture 300 in which implementations of the disclosure may operate. As shown in FIG. 3, system architecture 300 includes a manufacturing system 302, a data store 312, a server 320, a client device 350, and/or a machine learning system 370. The machine learning system 370 may be a part of the server 320. In some embodiments, one or more components of the machine learning system 370 may be fully or partially integrated into client device 350. The manufacturing system 302, the data store 312, the server 320, the client device 350, and the machine learning system 370 can each be hosted by one or more computing devices including server computers, desktop computers, laptop computers, tablet computers, notebook computers, personal digital assistants (PDAs), mobile communication devices, cell phones, hand-held computers, augmented reality (AR) displays and/or headsets, virtual reality (VR) displays and/or headsets, mixed reality (MR) displays and/or headsets, or similar computing devices. The server, as used herein, may refer to a server but may also include an edge computing device, an on premise server, a cloud, and the like.

The manufacturing system 302, the data store 312, the server 320, the client device 350, and the machine learning system 370 may be coupled to each other via a network (e.g., for performing methodology described herein). In some embodiments, network 340 is a private network that provides each element of system architecture 300 with access to each other and other privately available computing devices. Network 340 may include one or more wide area networks (WANs), local area networks (LANs), wires network (e.g., Ethernet network), wireless networks (e.g., an 802.11 network or a Wi-Fi network), cellular network (e.g., a Long Term Evolution (LTE) network), cloud network, cloud service, routers, hubs, switches, server computers, and/or any combination thereof. Alternatively or additionally, any of the elements of the system architecture 300 can be integrated together or otherwise coupled without the use of the network 340.

The client device 350 may be or include any personal computers (PCs), laptops, mobile phones, tablet computers, netbook computers, network connected televisions ("smart TV"), network-connected media players (e.g., Blue-ray player), a set-top-box, over-the-top (OTT) streaming devices, operator boxes, etc. The client device 350 may include a browser 352, an application 354, and/or other tools as described and performed by other systems of the system architecture 300. In some embodiments, the client device 350 may be capable of accessing the manufacturing system 302, the data store 312, the server 320, and/or the machine learning system 370 and communicating (e.g., transmitting and/or receiving) indications of eco-efficiency including one or more environmental resource consumption (e.g., an environmental resource consumption) and/or environmental impact, and/or inputs and outputs of various process tools (e.g., component integration tool 322, digital replica tool 324, optimization tool 326, recipe builder tool 328, resource consumption tool 330, and so on) at various stages of processing of the system architecture 300, as described herein.

As shown in FIG. 3, manufacturing system 302 includes manufacturing equipment 304, system controllers 306, process recipes 308, and sensors 310. The manufacturing equipment 304 may be any combination of an ion implanter, an etch reactor (e.g., a processing chamber), a photolithography devices, a deposition device (e.g., for performing chemical vapor deposition (CVD), physical vapor deposition (PVD), ion-assisted deposition (IAD), and so on), or any other combination of manufacturing devices.

Process recipes 308, also referred to as fabrication recipes or fabrication process instructions, include an ordering of machine operations with process implementation that when applied in a designated order create a fabricated sample (e.g., a substrate or wafer having predetermined properties or meeting predetermined specifications). In some embodiments, the process recipes are stored in a data store or, alternatively or additionally, stored in a manner to generate a table of data indicative of the steps or operations of the fabrication process. Each step may be associated with known environmental resource usage data. Alternatively or additionally, each process step may be associated with parameters indicative of physical conditions of a process step (e.g., target pressure, temperature, exhaust, energy throughput, and the like).

System controllers 306 may include software and/or hardware components capable of carrying out steps of process recipes 308. The system controllers 306 may monitor a manufacturing process through sensors 310. Sensors 310 may measure process parameters to determine whether process criteria are met. Process criteria may be associated with a process parameter value window. Sensors 310 may include a variety of sensors that can be used to measure (explicitly or as a measure of) consumptions (e.g., power, current, etc.). Sensors 310 could include physical sensors, integral sensors that are components of process chambers, external sensors, Internet-of-Things (IoT) and/or virtual sensors (e.g., Sensors that are not physical sensors but based virtual measurements based on model that estimate parameter values), and so on.

Additionally or alternatively, system controllers 306 may monitor the eco-efficiency by measuring resource consumption of various process steps (e.g., exhaust, energy consumption, process ingredient consumption etc.). In some embodiments, the system controllers 306 determine the eco-efficiency of associated manufacturing equipment 304. System controllers 306 may also adjust settings associated with the manufacturing equipment 304 based on the determined eco-efficiency models (e.g., including determined modifications to process recipes 308) so as to optimize the eco-efficiency of equipment 304 in light of the current manufacturing conditions.

In one embodiment, system controllers 306 may include a main memory (e.g., read-only memory (ROM), flash memory, dynamic random access memory (DRAM), static random access memory (SRAM), etc.), and/or secondary memory (e.g., a data store device such as a disk drive (e.g., data store 312 or cloud data). The main memory and/or secondary memory may store instructions for performing various types of manufacturing processes (e.g., process recipes 308).

In one embodiment, system controllers 306 may determine an actual eco-efficiency characterization associated with the manufacturing equipment 304 based on first utility use data associated with the manufacturing equipment 304 and first utilization data associated with the manufacturing equipment 304. The first utility use data and first utilization data may be determined by the system controllers 306, for example. In another embodiment, the first utility use data and first utilization data are received from an external source (e.g., server 320, cloud service and/or cloud data store). System controllers 306 may compare the actual eco-efficiency characterization to a first eco-efficiency characterization (e.g., a first estimated eco-efficiency characterization) associated with the manufacturing equipment 304. The eco-efficiency characterizations may be different when different use and utilization data values were used to compute the first eco-efficiency characterization than the actual values associated with the operating manufacturing equipment 304.

In one embodiment, system controllers 306 may determine that the first eco-efficiency characterization is more eco-efficient than the actual eco-efficiency characterization, indicating that it may be possible to adjust settings on the manufacturing equipment 304 to better optimize the manufacturing equipment 304 for eco-efficiency. In some embodiments, manufacturing equipment 304 may control and adjust subcomponent settings to better optimize eco-efficiency.

System controllers 306 may also determine based on the actual use data, actual utilization data, and an eco-efficiency characterization that the actual use data or the actual utilization data is not the same as use data and utilization data associated with the first eco-efficiency characterization. This may be the case when nominal or estimated data values are used to determine the first eco-efficiency characterization and different, actual recorded data values are used while the manufacturing equipment 304 is in operation. In such a scenario, an adjustment to one or more settings associated with the manufacturing equipment 304 may be beneficial to optimize the eco-efficiency of the manufacturing equipment.

Data store 312 may be a memory (e.g., a random access memory), a drive (e.g., a hard drive, a flash drive), a database system, or another type of component or device capable of storing data such as a store provided by a cloud server and/or processor. Data store 312 may store one or more historical sensor data. Data store 312 may store one or more eco-efficiency data 314 (e.g., including historical and/or current eco-efficiency data), sensor and process recipe data 316 (e.g., including historical and/or current sensor and process recipe data 316), modification and optimization data (e.g., including historical and/or current modification and optimization data 318), and digital replica data 319. The sensor and process recipe data 316 may include various process steps, process parameter windows, alternative process steps, process queuing instruction, and so on for performing multiple processes on overlapping manufacturing equipment. The sensor and process recipe data 316 may be linked or otherwise associated with the eco-efficiency data 314 to track eco-efficiency across various process steps, recipes, etc. The modification and optimization data 318 may include historical modifications made to prior process recipes (including individual process steps, or coordination of multiple process recipes) and associated eco-efficiency changes resulting from the modifications.

The eco-efficiency data 314 may include various consumption resources used in an eco-efficiency characterization. In one embodiment, eco-efficiency data 314 incorporates one or more of water usage, emissions, electrical energy usage, and any combination thereof. In other embodiments, eco-efficiency data 314 may include resource consumption for other categories, such as gas usage, heavy metals usage, and eutrophication potential.

The digital replica data 319 may include data associated with a digital replica. The digital replica data 319 may include data associated with a digital twin. As used herein, a digital twin may include a digital replica of a physical asset, such as manufacturing equipment 304. The digital twin includes characteristics of the physical asset at each stage of the manufacturing process, in which the characteristics include, but are not limited to, coordinate axis dimensions, weight characteristics, material characteristics (e.g., density, surface roughness), electrical characteristics (e.g., conductivity), optical characteristics (e.g., reflectivity), etc.

As previously discussed, a digital replica may include a physics-based model of one or more physical assets of the substrate fabrication system. The digital replica data 319 may encapsulate relationships, parameters, specifications, etc. associated with one or more aspects of the physics-based model. For example, the physics-based model may indicate a relationship between a size and a geometry of a substrate process chamber and the environment resource consumption. The update may be associated with a modification to at least one of the size or the geometry of the substrate processing chamber. The physics-based model may indicate a relationship between a type of purge gas used within the substrate fabrication system and the environment resource consumption. The update may be associated with how an environmental resource consumption is changed by modifying the type and quantity of gas used to purge a system. For example, a specific resource consumption update may include how environmental resource consumption is effect by changing a purge gas used from a first purge gas such as nitrogen to clean dry air (CDA). The physics-based model may indicate a relationship between a heat extraction procedure from the substrate fabrication system and the environment resource consumption. The update may be associated with a modification to at least one of a heat exhaust device, a gas abatement device, a water cooling device, or a gas vent structure.

Server 320 may include a component integration tool 322, a digital replica tool 324, an optimization tool 326, a recipe builder tool 328, a resource consumption tool 330, and/or an exploration tool. The component integration tool 322 may determine a cumulative consumption per device (e.g., per individual manufacturing equipment). The various tools of server 320 may communicate data between each other to carry out each respective function, as described herein.

The component integration tool 322 may receive manufacturing data (e.g., recipes, selections of recipes, manufacturing equipment, inter-recipe and intra-recipe processes, and so on) and perform an eco-efficiency analysis across varying divisions of the data. In some embodiments, the component integration tool 322 may determine an eco-efficiency characterization across multiple process steps from an individual process recipe. For example, the component integration tool 322 may determine an eco-efficiency characterization across all steps of a chip fabrication process from start to finish. For example, each fabrication step may include one or more fabrication steps (e.g., hundreds of fabrication steps) each having an eco-efficiency characterization and together a collective eco-efficiency characterization. In another example, a selection of the processes may be used to determine an eco-efficiency of a subset of the fabrication process steps.

In another embodiment, the component integration tool 322 may perform an eco-efficiency characterization of inter recipe processes. For example, an eco-efficiency characterization may be associated with a manufacturing device (e.g. of manufacturing system 302) performing multiple different process steps from multiple different manufacturing processes (e.g. process recipes 308). In another example, the ordering of various process steps (e.g., intra-recipe or inter-recipe) may affect an overall eco-efficiency. The component integration tool 322 may perform an overall eco-efficiency characterization across a system of manufacturing devices and/or sequence of processes. For example, the component integration tool 322 may perform an eco-efficiency comparison between subcomponents performing similar functions (e.g., multiple processing chambers).

In an illustrative example, each process step may be done by a processing chamber such as epitaxial deposition or etch. Each of these is done using a process recipe. There may be many different process recipes for performing a process such as epitaxial deposition. For example, a process recipe may include multiple steps such as: 1) purge the chamber; 2) pump; 3) flow in gases; 4) heat the chamber, and so on. These steps may be associated with one or more process recipes.

In another embodiment, the component integration tool 322 may perform an eco-efficiency characterization that includes eco-efficiency of auxiliary equipment. Auxiliary equipment may include equipment not directly used for manufacturing but that assists in carrying out various process recipes. For example, auxiliary equipment may include substrate transport systems designed to move wafers between various fabrication devices. In another example, auxiliary equipment may include heat sinks, shared exhaust ports, power delivery system, etc. The component integration tool 322 may account for auxiliary device resource consumption and combine auxiliary device resource consumption with fabrication resource consumption to determine a resource consumption for a process recipe (e.g., subset or whole recipe) or combination of recipes (e.g., subsets or whole recipes).

In another embodiment, the component integration tool 322 may perform an eco-efficiency characterization that accounts for a sequence of processes or recipes. For example, performing process step A followed by process step B may result in a first resource consumption while performing process step B followed by process step A may result in a second resource consumption different than the first resource consumption. The component integration tool 322 integrates an eco-efficiency over multiple machine equipment and/or process steps and accounts for the sequence of process steps for a process recipe (e.g., subset or whole recipe) or combination of recipes (e.g., subset or whole recipes).

In some embodiments, there is different manufacturing equipment for each of the process steps. For example a film on a wafer may have multiple layers. A first machine may perform a first operation (e.g., deposition), a second machine may perform a second operation (e.g., etching), a third machine may perform a third operation (e.g., deposition), and so on. The component integration tool 322 may instruct a resource consumption tracker to track multiple processing steps across multiple machines to generate a data stash report. As mentioned previously, a consumption report can be drawn for a selection of a processing recipe, including the life of a wafer from start to finish.

In some embodiments, the component integration tool 322 may perform a chamber to chamber environmental resource consumption comparison. The component integration tool may leverage the digital replica tool 324 to provide one or more physics data that indicates rationale for the difference in eco-efficiency between the two chambers.

The digital replica tool 324 receives manufacturing data from manufacturing system 302 and/or client device 350 and generates a digital replica associated with the manufacturing data. The manufacturing data my include a selection of manufacturing equipment 304 and process steps to a process recipe 308. The digital replica tool 324 generates a digital twin of the physical system architecture of the manufacturing system or a virtual inputted system (e.g., generated by a user on the client device 350).

The digital replica generated by the digital replica tool 324 may include one of a physics model, a statistical model, and/or a hybrid model. A physics model may include physics based constraints and control algorithms designed to estimate physical conditions (e.g., exhaust temperatures, power delivery requirements, and/or other conditions indicative of a physics environment associated with environmental resource consumption) of the inputted manufacturing data. For example, a user may create a process recipe on client device 350. The process recipe may include parameters for a process or recipe and instructions to use machine equipment in a certain way. The digital replica tool 324 would take this manufacturing data and determine physical constraints of the system (e.g., operating temperature, pressure, exhaust parameters, etc.). For example, the physics model may identify physical conditions of a system based on the hardware configurations of chamber (e.g., using equipment material of type A versus equipment material of type B) and/or recipe parameters. In another example, physical conditions may be determined from relevant machine equipment parts that affect heat loss to water, air, and/or heating ventilation, and air conditioning (HVAC) equipment. The digital replica tool 324 may work with other tools (e.g., component integration tool 322 and/or resource consumption tool 330) to predict an eco-efficiency characterization of the received manufacturing data. It should be noted that the digital replica tool 324 may predict an eco-efficiency of a manufacturing process and selection of manufacturing equipment without receiving empirical data from performing the process recipe by the manufacturing equipment 304. Accordingly, digital replicas of manufacturing equipment may be used to predict the eco-efficiency of equipment designs and/or process recipes without actually building particular equipment designs or running particular process recipes.

In some embodiments, the digital replica tool 324 may operate in association with a digital twin. As used herein, a digital twin is a digital replica of a physical asset, such as a manufactured part. The digital twin includes characteristics of the physics asset at each stage of the manufacturing process, in which the characteristics include, but are not limited to, coordinate axis dimensions, weight characteristics, material characteristics (e.g., density, surface roughness), electrical characteristics (e.g., conductivity), optical characteristics (e.g., reflectivity), among other things.

In some embodiments, the physical models used by the digital replica tool 324 may include fluid flow modeling, gas flow and/or consumption modeling, chemical based modeling, heat transfer modeling, electrical energy consumption modeling, plasma modeling, and so on.

In some embodiments, the digital replica tool 324 may employ statistical modeling to predict eco-efficiency of manufacturing data. A statistical model may be used to process manufacturing data based on previously processed historical eco-efficiency data (e.g., eco-efficiency data 314) using statistical operations to validate, predict, and/or transform the manufacturing data. In some embodiments, the statistical model is generated using statistical process control (SPC) analysis to determine control limits for data and identify data as being more or less dependable based on those control limits. In some embodiments, the statistical model is associated with univariate and/or multivariate data analysis. For example, various parameters can be analyzed using the statistical model to determine patterns and correlations through statistical processes (e.g., range, minimum, maximum, quartiles, variance, standard deviation, and so on). In another example, relationships between multiple variables can be ascertained using regression analysis, path analysis, factor analysis, multivariate statistical process control (MCSPC) and/or multivariate analysis of variance (MANOVA).

The optimization tool 326 may receive selection of process recipes 308 and manufacturing equipment 304 and identify modifications to the selections to improve eco-efficiency (e.g., reduce resource consumption, resource cost consumption, and/or environmental impact (e.g., gaseous or particulate species entering the atmosphere)). The optimization tool 326 may incorporate use of a machine learning model (e.g., model 390 of machine learning system 370). The machine learning model may receive as input a selection of a process recipe and/or machine equipment and determine one or more modification to the selection that improves overall eco-efficiency of the selection when performed by the manufacturing system 302. In some embodiments, the machine learning model may use the digital replica tool for generating synthetic manufacturing data for training. Alternatively or additionally, the machine learning model may use historical data (e.g., eco-efficiency data 314, sensor and process recipe data 316, and/or modification and optimization data 318) to train the machine learning model.

The modifications identified by the optimization tool 326 may include altering a process step, changing the order of a process, altering parameters performed by a piece of machine equipment, altering an interaction of a first process recipe with a second process recipe (e.g., order, simultaneous operations, delay times, etc.), and so on. In some embodiments, the optimization tool 326 may send instruction to manufacturing system 302 to perform the optimization directly. However, in other embodiments, the optimization tool may display the modifications on a graphical user interface (GUI) for an operator to act upon. For example, the digital replica tool 324 may send one or more modification to the client device 350 for display in the browser 352 and/or application 354.

In some embodiments, the optimization tool 326 may adjust hyper parameters of a digital twin model generated by the digital replica tool 324. As will be discussed in later embodiments, the optimization tool 326 may incorporate reinforcement learning and/or deep learning by running simulated modifications on the digital replica and evaluating eco-efficiency outcomes output from the digital replica.

In some embodiments, the optimization tool 326 may perform an eco-efficiency characterization and optimization that prioritizes one or more types of environmental resources. For example, as described previously eco-efficiency characterization can be based on various resource consumptions such as water usage, gas usage, energy usage, and so on. The optimization tool 326 may perform an optimization that prioritizes a first resource consumption (e.g., water usage) over a second resource consumption (e.g., gas usage). In some embodiments, the optimization tool 326 may perform an optimization that uses a weighted priority system. For example, when optimizing eco-efficiency and/or identifying eco-efficiency modification to a fabrication process one or more resource consumptions may be assigned a weight indicative of an optimization priority for the associated per-unit resource consumption.

The recipe builder tool 328 may receive a selection of manufacturing processes and/or machine equipment and determine and predict eco-efficiency dynamically step-by-step after each addition, deletion, and/or modification to a virtual manufacturing process and/or equipment selection. Recipe builder tool 328 can use other tools (e.g., component integration tool 322, the digital replica tool 324, optimization tool 326, and resource consumption tool 330) to dynamically update a determined eco-efficiency when a manufacturing recipe is updated. For example, a user may create a manufacturing recipe. The recipe builder tool 328 may output a current eco-efficiency of a current iteration of a process recipe. The recipe builder tool 328 may receive a modification to the current iteration that updated the process recipe. The recipe builder tool 328 may output an updated eco-efficiency characterization.

In some embodiments, the recipe builder tool 328 and the optimization tool 326 may be used to identify one or more recipes as being more eco-efficient than others. For example the recipe builder tool 328 may cause or other provide for presentation on GUI (e.g., client device 350) one or more (e.g., the top three) of the most energy-efficient recipes associated with a process tool. The recipe builder tool 328 may provide, using the digital replica tool 324, details that indicate rationale for why the one or more energy-efficient recipes are performing at the corresponding high eco-efficiency.

The resource consumption tool 330 may track various resource consumptions. For example, as mentioned previously eco-characterization may be based on more widespread resources such as energy consumption, gas emissions, water usage, etc. However, the resource consumption tool 330 can track resource consumption more specifically. In some embodiments, a selection of process recipes and/or manufacturing equipment is received by resource consumption tool 330. The resource consumption tool 330 can determine life-cycle data of a component associated with the selection of manufacturing equipment and/or process recipes. For example, manufacturing equipment wears down over use and in some instances requires corrective action such as replacement and/or repairing a component. This corrective action also is associated with an environmental consumption (e.g., resource consumption to perform the corrective action). The resource consumption tool 330 can individually track component life-time data and provide a per-unit environmental resource consumption and/or environmental impact based on anticipated future corrective action to be performed.

In some embodiments, the environmental resource consumption can be monitored, tracked, and/or otherwise determined across a variety of breakdowns. In some embodiments, the resource consumption tool 330 may perform live monitoring of energy, gas and water consumption. The resource consumption tool 330 may determine a chamber level consumption including calculating a total electrical, gas, and water consumption of a chamber (e.g., per wafer, per day, per week, per year, etc.). The resource consumption tool 330 may determine tool level consumption including determining a total electrical, gas, and water consumption of a tool (e.g., per day, per week, per year, etc.). The resource consumption tool 330 may determine individual gas consumption including determining a break up of individual gas consumption (e.g., per wafer, per day, per week, per year, etc.) The resource consumption tool 330 may generate a standard report including a chamber and tool level energy, gas, and water consumption.

In some embodiments, the resource consumption tool 330 may determine total electrical, gas, and water consumption of all the subfab components (e.g., per day, per week, per year, etc.) The resource consumption tool may determine recipe level consumption including total electrical, gas, and water consumption of any recipe run on a corresponding chamber and/or tool. The resource consumption tool may determine component level consumption including a break up of energy consumption for all energy consuming components in a chamber. The resource consumption tool 330 may perform an on demand customized report including determining on demand customized information and customized eco-efficiencies reports on demand. The resource consumption tool 330 may perform a comparison between energy consumption for different recipes and/points in time including quantifying energy savings, and energy savings opportunities using recipe optimization (e.g., using optimization tool 326).

The exploration tool 332 may communicate with digital replica tool 324 in determining the effects of one or more updates to manufacturing equipment 304. The exploration tool 332 may leverage the digital replica tool 324 to generate a digital replica that includes a digital reproduction of the substrate fabrication system (e.g., manufacturing equipment 304). The exploration tool may receive an update to the manufacturing equipment and allow a user to explore various alternative arrangement to equipment used, configuration of equipment, process parameters associated with equipment performance, among other things. The exploration tool 332 may employ the resource consumption tool 330 to determine environmental resource usage data corresponding to performing the one or more process procedures by the substrate fabrication system incorporating the update as described herein. The environmental resource usage data may be provided for display on a graphical user interface (GUI) (e.g., on client device 350).

In some embodiments, an update to a fabrication system may include replacing a first hardware subsystem device with a second hardware subsystem device having one or more operational specifications different from the first hardware subsystem device. In an exemplary embodiment, an update to a fabrication system may include altering the first configuration of manufacturing equipment to a second configuration of manufacturing equipment. In an exemplary embodiment, an update to a fabrication system may include altering a scheduled operational mode of a physical asset of the substrate fabrication system, wherein the scheduled operational mode includes a reduced power mode. In an exemplary embodiment, the update includes altering a scheduled operational mode to of a support asset of the substrate fabrication system to a shared operational mode, wherein the support asset operating in the shared operational mode alternates carrying out a support function for multiple physical assets of the substrate fabrication system carrying out the one or more process procedures.

In some embodiments, the digital twin may be used to estimate life time of some consumables associated with a fabrication process step. Life time data may be used to estimate a life time duration and predict upcoming remedial steps to be taken in response to the predicted lifetime. For example, life time data may be used to maintain an optimized eco-efficiency performance by proactively informing supply chain for replacement part ordering.

In some embodiments, environmental resource usage data determined by other tools of the server may include environmental resource consumption and/or environmental impact associated with one of a replacement procedure or an upkeep procedure of a consumable part of the first manufacturing equipment. In some embodiments, the optimization tool 326 may determine modifications to a manufacturing process that may include performing a corrected action associated with a component of the machine equipment (e.g., manufacturing equipment 304).

The exploration tool 332 may perform a cost of ownership analysis associated with the fabrication system. The cost of ownership analysis may include a comprehensive analysis into the interworking of a fabrication system to calculate a total cost to own and/or operate the system. The exploration tool 332 may calculate a cost for a customer to perform a particular fabrication procedure. The exploration tool 332 may determine a wafer cost, a cost corresponding to the gas used by the system, a cost associated with a tool being used (e.g., lifetime degradation data), and electricity for performing one or more process procedures by the fabrication system. The cost of ownership may be calculated on a per-unit (e.g., per wafer basis).

In some embodiments, machine learning system 370 further includes server machine 372, server machine 380, and/or server machine 392. Server machine 372 includes a data set generator 374 that is capable of generating data sets (e.g., a set of data inputs and a set of target outputs) to train, validate, and/or test a machine learning model 390.

Server machine 380 includes a training engine 382, a validation engine 384, and/or a testing engine 386. An engine (e.g., training engine 382, a validation engine 384, and/or a testing engine 386) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 382 may be capable of training a machine learning model 390 using one or more sets of features associated with the training set from data set generator 374. The training engine 382 may generate one or multiple trained machine learning models 390, where each trained machine learning model 390 may be trained based on a distinct set of features of the training set and/or a distinct set of labels of the training set. For example, a first trained machine learning model may have been trained using resource consumption data output by the digital replica tool 324, a second trained machine learning model may have been trained using historical eco-efficiency data (e.g., eco-efficiency data 314), and so on.

The validation engine 384 may be capable of validating a trained machine learning model 390 using the validation set from data set generator 374. The testing engine 386 may be capable of testing a trained machine learning model 390 using a testing set from data set generator 374.

The machine learning model(s) 390 may refer to the one or more trained machine learning models that are created by the training engine 382 using a training set that includes data inputs and, in some embodiments, corresponding target outputs (e.g., correct answers for respective training inputs). Patterns in the data sets can be found that cluster the data input and/or map the data input to the target output (the correct answer), and the machine learning model 390 is provided mappings and/or learns mappings that capture these patterns. The machine learning model(s) 390 may include artificial neural networks, deep neural networks, convolutional neural networks, recurrent neural networks (e.g., long short term memory (LSTM) networks, convLSTM networks, etc.), and/or other types of neural networks. The machine learning models 390 may additionally or alternatively include other types of machine learning models, such as those that use one or more of linear regression, Gaussian regression, random forests, support vector machines, and so on.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a machine learning model may roughly be divided into supervised learning and unsupervised learning. Both techniques for training a machine learning model may be used in embodiments. In one embodiment, training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and backpropagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

For model training, a training dataset containing hundreds, thousands, tens of thousands, hundreds of thousands or more data inputs should be used to form a training dataset. In embodiments, up to thousands, tens of thousands, hundreds of thousands or millions of cases of historical data (e.g., of processes executed in processing chambers and associated labels of resource consumption) may be available for forming a training dataset, where each case may include various labels of one or more types of useful information. Each case may include, for example, data showing a process chamber, a recipe, various resource utilizations, and so on. This data may be processed to generate one or multiple training datasets for training of one or more machine learning models. The machine learning models may be trained, for example, to estimate resource consummation and/or eco-efficiency, to propose modifications to a recipe and/or process chamber, and so on based on input process chamber and/or recipe information. Such trained machine learning models can be added to an eco-efficiency dashboard, and can be applied to provide detailed information about resource consumption and eco-efficiency as well as ways to reduce resource consumption and/or improve eco-efficiency before, during and/or after execution of a process on a process chamber.

Processing logic may gather a training dataset comprising historical process run information having one or more associated labels (e.g., of resource consumption, eco-efficiency values, recommendations for improved process recipe parameters, etc.). The training dataset may additionally or alternatively be augmented. Training of large-scale neural networks generally uses tens of thousands of inputs, which are not easy to acquire in many real-world applications. Data augmentation can be used to artificially increase the effective sample size.

To effectuate training, processing logic inputs the training dataset(s) into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the data inputs into the machine learning model one at a time. Each input may include data from a historical process run in a training data item from the training dataset. The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. Accordingly, the output may include predicted or estimated resource consumption for one or more types of resources, may include an eco-efficiency value, and so on.

Processing logic may then compare the generated output to the known label that was included in the training data item. Processing logic determines an error (i.e., a classification error) based on the differences between the output and the provided label(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

Modification identification component 394 may provide current data to the trained machine learning model 390 and may run the trained machine learning model 390 on the input to obtain one or more outputs. The modification identification component 394 may be capable of making determinations and/or performing operations from the output of the trained machine learning model 390. ML model outputs may include confidence data that indicates a level of confidence that the ML model outputs (e.g., modification and optimization parameters) correspond to modifications that when applied improve an overall eco-efficiency of a selection of a manufacturing process and/or manufacturing equipment. The modification identification component 394 may perform process recipe modifications based on the ML model outputs in some embodiments. The modification identification component 394 may provide the ML model outputs to one or more tools of the server 320.

The confidence data may include or indicate a level of confidence that the ML model output is correct (e.g., ML model output corresponds to a known label associated with a training data item). In one example, the level of confidence is a real number between 0 and 1 inclusive, where 0 indicates no confidence that the ML model output is correct and 1 indicates absolute confidence that the ML model output is correct. Responsive to the confidence data indicating a level of confidence below a threshold level for a predetermined number of instances (e.g., percentage of instances, frequency of instances, total number of instances, etc.) the server 320 may cause the trained machine learning model 390 to be re-trained.

For purpose of illustration, rather than limitation, aspects of the disclosure describe the training of a machine learning model using process recipe data and inputting a current selection of a manufacturing process and/or manufacturing equipment into the trained machine learning model to determine ML model output (process modification and optimization parameters such as a target eco-efficiency of a specific resource consumption). In other implementations, a heuristic model or rule-based model is used to determine an output (e.g., without using a trained machine learning model).

In some embodiments, the functions of manufacturing system 302, client device 350, machine learning system 370, data store 312, and/or server 320 may be provided by a fewer number of machines. For example, in some embodiments server machines 372 and 380 may be integrated into a single machine, while in some other embodiments, server machine 372, server machine 380, and server machine 392 may be integrated into a single machine. In some embodiments, server 320, manufacturing system 302, and client device 350 may be integrated into a single machine.

In general, functions described in one embodiment as being performed by manufacturing system 302, client device 350, and/or machine learning system 370 can also be performed on server 320 in other embodiments, if appropriate. In addition, the functionality attributed to a particular component can be performed by different or multiple components operating together. For example, in some embodiments, the server 320 may receive manufacturing data and perform machine learning operations. In another example, client device 350 may perform the manufacturing data processing based on output from the trained machine learning model.

In addition, the functions of a particular component can be performed by different or multiple components operating together. One or more of the server 320, manufacturing system 302, or machine learning system 370 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Figure 4:
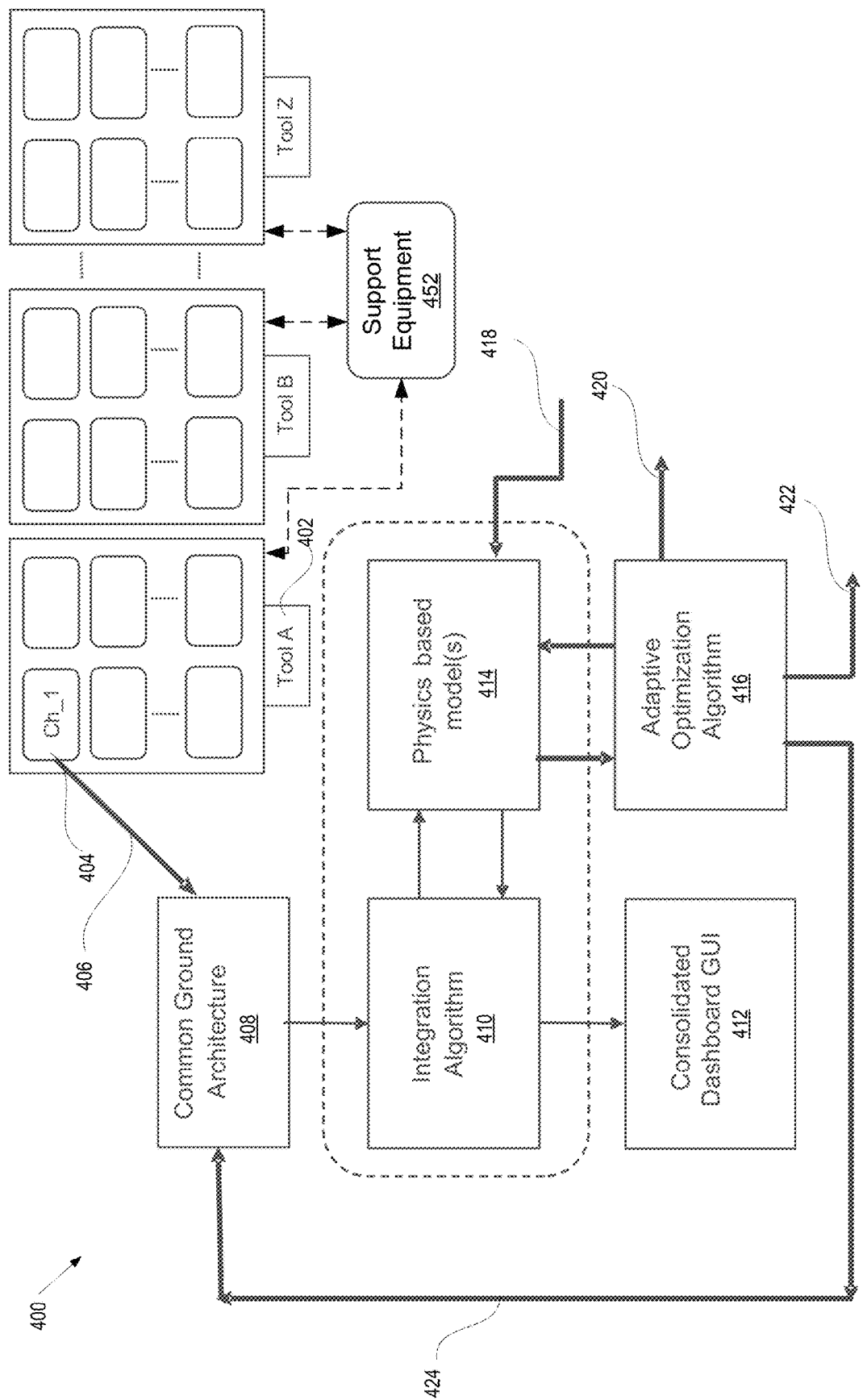
FIG. 4 is a block diagram illustrates an eco-efficiency sustainability system architecture in which implementations of the disclosure may operate.

FIG. 4 is a block diagram that illustrates an eco-efficiency sustainability system architecture 400 in which implementations of the disclosure may operate. The system architecture 400 includes a selection of processing tools 402 with one or more subcomponents 404 (e.g., processing chambers). The system architecture may further include support equipment 452 such as power supplies, pumps, air flow, coolant flow, and the like that support one or more subcomponents. As described previously processing tools 402 include various manufacturing tools used for processing substrates. At line 406, sensors (including sensors of process chambers and external sensors) measure and transmit manufacturing data (e.g., energy consumption sensor data, gases and water consumption data, etc.) to a common ground architecture 408. The common ground architecture 408 may include one or more control algorithm configured to carry out fabrication process steps and manage process parameters (e.g., critical process parameter, machine equipment diagnostic parameters, or parameters otherwise indicative of a manufacturing process)

The common ground architecture 408 may transmit the sensor data (e.g., from wired sensor and/or wireless sensors such as internet of things (IoT) sensor) to a data management algorithm (e.g., integration algorithm 410). The integration algorithm 410 may parse the manufacturing data received from the processing tools 402 to select a portion of the data to perform an eco-efficiency characterization. The integration algorithm 410 pulls data to perform a cumulative eco-efficiency characterization over a selection of manufacturing process steps and/or manufacturing equipment. The selected data may be used in association with a physics based model 414 to determine physical conditions of the processing tool 402 (e.g., of each subcomponent 404). The data may be combined with scheduling information from an onboard sequencer and/or planner or from an operator (e.g., at line 418). The scheduling information may include data indicative of upcoming recipes, tool idle states, maintenance, and so on. In some embodiments, one or more data and/or models described herein may be integrated in one or more of a fabrication central scheduler network or software system or a manufacturing execution system.

The selection of manufacturing data combined with the scheduling data may be input into the physics-based model 414. In some embodiments the physics-based model is a mechanistic model. The mechanistic model examines the workings of individual data points of the manufacturing data and scheduling information and the manner to which the individual data points are coupled to determine a physical/mechanistic representation of the data coupling. In some embodiments, the mechanistic model may include processing the data to determine a prediction of resource consumption. For example, the mechanistic model may process the manufacturing data to determine a resource consumption (e.g., water, energy, gas, etc.) prediction and/or environmental impact (e.g., gaseous or particulate species entering the atmosphere). The mechanistic model may be generated using historical manufacturing data and later used on current data to determine a prediction.

In some embodiments, the physics based model(s) 414 may incorporate various physics relationships such as thermodynamics, fluid dynamics, energy conservation, gas laws, mechanical system, energy conservation, transportation, and delivery, and so on. For example, a processing tool may include a cooling water flow to a part of a manufacturing equipment device to perform a cooling process. A physics model may incorporate fluid mechanics with heat transfer to determine a model for transforming raw manufacturing data to system process data that can be characterized for its eco-efficiency. In some embodiments, the physics models may be used to determine whether a threshold resource consumption condition is being met. Along the same example, a physics model can be used to determine a flow rate of the fluid and in turn a heat transfer rate within a subcomponent. If this heat transfer rate is below a threshold rate additional energy may be lost to exhaust. The physics model can thus determine that the fluid flow rate is operating below a desired flow rate level to maintain a desired level of eco-efficiency.

In some embodiments, the physics based model(s) 414 incorporates auxiliary or peripheral equipment operational resource consumption. For example, the energy consumption of powering a processing device to provide control algorithms (e.g., using the common ground architecture 408) to the processing tools 402. The auxiliary equipment may not be disposed proximate the manufacturing equipment nor be directly associated with a single manufacturing process but can be apportioned as contributions to various manufacturing processes steps (or individual manufacturing processes) using the physics based model(s) 414.

In some embodiments, in addition to or alternatively to use of a physics model, a statistical model is used on the manufacturing data. A statistical model may be used to process the data based on statistical operations to validate, predict, and/or transform the manufacturing data. In some embodiments, the statistical model is generated using statistical process control (SPC) analysis to determine control limits for data and identify data as being more or less dependable based on those control limits. In some embodiments, the statistical model is associated with univariate and/or multivariate data analysis. For example, various parameters can be analyzed using the statistical model to determine patterns and correlations through statistical processes (e.g., range, minimum, maximum, quartiles, variance, standard deviation, and so on). In another example, relationships between multiple variables can be ascertained using regression analysis, path analysis, factor analysis, multivariate statistical process control (MCSPC) and/or multivariate analysis of variance (MANOVA).

In some embodiments, the system architecture 400 includes and adaptive optimization algorithm 416. The adaptive optimization algorithm 416 works with the physics based model(s) 414 to determine modification to selections of manufacturing processes and/or manufacturing equipment performing associated processes. In some embodiments, the adaptive optimization algorithm outputs automatic optimization commands to control software (e.g., at line 424). In other embodiments, the adaptive optimization algorithm may output suggestions to an operator to optimize performance (e.g., at line 420). In some embodiments, the adaptive optimization algorithm outputs automatic optimization commands directed to hardware components (e.g. at line 422).

In some embodiments, the adaptive optimization algorithm 416 uses a machine learning model to determine modifications to manufacturing processes and/or manufacturing equipment. The machine learning model may be a trained machine learning model (e.g., trained and executed using method 800). As will be discussed in further embodiments, the machine learning model may operate with the physics-based models to identify modifications to manufacturing processes and/or equipment received as input.

The system architecture 400 may include a consolidated dashboard GUI 412. The consolidated dashboard GUI may be designed to display relevant manufacturing data (e.g., sensor data, machine equipment diagnostics, machine equipment status, manufacturing process status, etc.). In some embodiments, the consolidated dashboard GUI includes methods to receive input from a user. For example, a user may input manufacturing data (e.g., using the recipe builder tool 328) to generate a recipe. This additional manufacturing data may be used as input into one or more of the physics based model(s) and adaptive optimization algorithm 416. In embodiments, the dashboard includes a fleet view, a tool view, an equipment view, and system schematics illustrating various data with graphical depicts indicating corresponding environmental resource consumption. FIGS. 9A-E discuss further features, aspects, and/or details pertaining to consolidated dashboard GUI.

Figure 5:
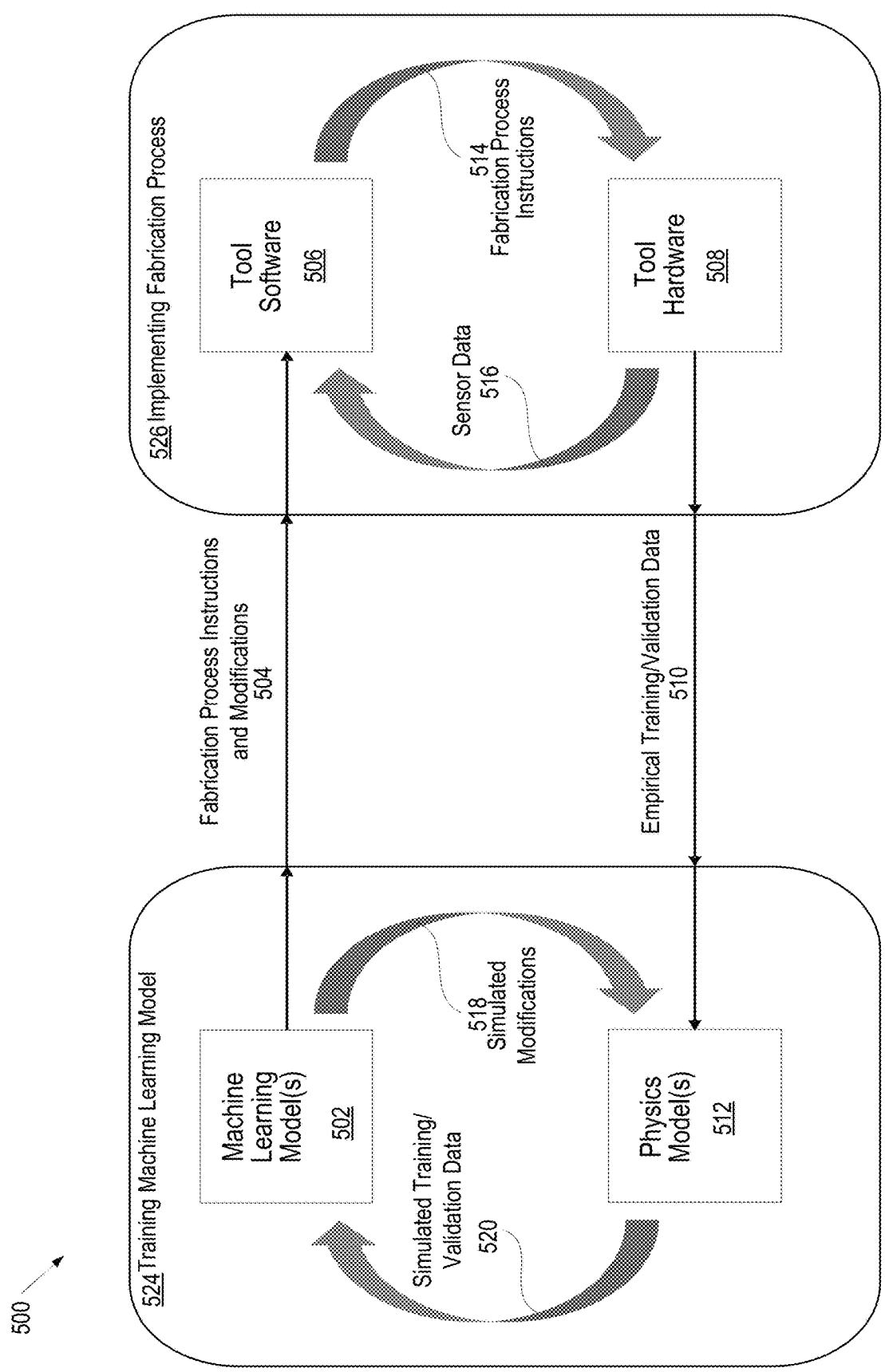
FIG. 5 depicts a flow diagram of an exemplary methodology for monitoring, sustaining, and/or optimizing a manufacturing process.

FIG. 5 depicts a flow diagram of an exemplary methodology 500 for monitoring, sustaining, and/or optimizing a manufacturing process. The exemplary methodology can be split into two parts: first, training a machine learning model 524 and second, implementing a fabrication process 526. The exemplary methodology 500 includes a machine learning model 502, tool software 506, tool hardware 508, and a physics model 512 in one embodiment.

In some embodiments, the machine learning model is to receive a selection of a manufacturing process and/or manufacturing equipment and output one or more modification to the manufacturing process and/or manufacturing equipment to improve eco-efficiency (e.g., reduce a resource consumption). In some embodiments, the physics model 512 is used to generate simulated training/validation data 520. Responsive to the received simulated training/validation data 520, the machine learning model 502 generates simulated modifications 518 that may be returned to the physics model 512 and validated. The machine learning model 502 is trained over a variety of simulated and/or real training/validation data 520. Once trained, the machine learning model 502 may receive a selection of an empirical fabrication system and/or a process recipe to be performed by the system. The machine learning model 502 outputs fabrication process instructions and/or modifications 504 to system controllers (e.g., system controller 128) implementing tool software. These modifications may improve eco-efficiency. The tool software 506 provides fabrication process instructions 514 to the tool hardware 508. The tool hardware 508 implements the fabrication process. The tool hardware includes sensors that report sensor data back to system controllers implementing the tool software 506.

In some embodiments, the system controllers identify one or more physical condition of the tool hardware as violating a threshold condition. (e.g., to high temperature, over pressure, gas leakage, power shortage, etc.). The system controller may modify the fabrication process instructions to remedy the violating threshold condition (e.g., based on an output from machine learning model 502).

The manufacturing system including tool hardware 508 reports empirical training/validation data 510 back to the physics model 512. The physics model may then be updated and may generate and update simulated training/validation data 520 that may be used to further training of the machine learning model.

In some embodiments, the physics model(s) 512 generates simulated training/validation data, however, in other embodiments the physics model(s) outputs modifications to a fabrication process. In such an embodiment, the machine learning model may be used as an optimization model that tunes hyper parameters (e.g., manufacturing data parameters) to identify modifications to further optimize the fabrication process. For example, a fabrication process may be used as input to physics model 512. The machine learning model may then process outputs of physics model 512 to identify potential changes (i.e., hyper parameters) to the fabrication process. The identified changes may be run on the physics model to determine corresponding updated eco-efficiencies. This may be repeated in an iterative process to fine-tune an equipment design and/or a recipe design. In an example the optimization model may be generated and/or implemented using an instance of the Broyden-Fletcher-Goldfarb-Shanno (BFGS) algorithm, a conjugate gradient (CG) algorithm, an instance of the Nelder-Mead algorithm, and/or a model predictive control (MPC) algorithm.

Figure 6:
FIG. 6 depicts an exemplary digital replica, in accordance with some implementations of the present disclosure.

FIG. 6 depicts an exemplary digital replica, in accordance with some implementations of the present disclosure. A digital replica 600 may include a digital twin of a selection of a fabrication system, and may include, for example, a digital reproduction of the fabrication system that includes the same chambers, valves, gas delivery lines, materials, chamber components, and so on. A digital replica 600 can receive as input manufacturing equipment processing data, which may include first sensor data 602-604 output by integral sensors of a process chamber and second sensor data 606-608 output by external sensors that are not components of the process chamber. The input may further include process recipes and/or output physical conditions of a manufacturing system that includes the process chamber. In some embodiments, the digital replica 600 includes a physics based model that can incorporate various physics relationships such as thermodynamics, fluid dynamics, energy conservation, gas laws, mechanical system, transportation, and deliver, and so on. The digital replica 600 processes the input data, and generates an output 610. The output may include one or more physical conditions of a process chamber and/or other system or device. The output may additionally or alternatively include environmental resource usage data.

In an example, the digital replica 600 may receive as input a first gas flow of a first gas, a second gas flow of a second gas, and a third gas flow of a third gas, and a first process recipe. The digital replica may use a physics based model to estimate the amount of energy leaving the chamber by the gas flow. For example, the model determines a temperature of exhaust and total energy flow through the exhaust. In another example the same digital replica 600 may output eco-efficiency optimization modifications such as different hardware configuration of the chamber (e.g., using a first line type A versus using a second line type B). The digital replica may identify relevant parts of the system that affect heat loss to water, air, and HVAC and identify suggested optimizations to improve energy conservation.

In some embodiments, digital replica 600 can determine exhaust for one or more gas panel or gas boxes that contain gases used in one or more places throughout a fabrication system. For example, each gas box may use a dedicated exhaust with a negative pressure to effectively evacuate gases such as in the case of leak or more generally malfunctions of the gas lines (e.g., to keep toxins from entering the fabrication facility or in undesired locations of the fabrication system). The digital replica may be part of a digital twin that leverages information about possible types and volumes of gases of the gas box and determine adjustments to exhaust flow needed to properly dispose of the gases (e.g., evacuate leaks). The evacuation flow rate may be determined in view of an exhaust pressure and a flow. The evacuation flow may include a determination of an associated parameter to optimize eco-efficiency while maintaining a minimum safety threshold and/or standard.

In some embodiments, digital replica 600 may indicate a temperature of exhaust and total energy flow through exhaust based on heating within the process chamber. For example, a process chamber may include one or more process equipment such as a substrate pedestal during a substrate process procedure. Excess heat from within the chamber may be abated through exhaust. Operations of the pedestal may be altered to reduce the heat lost through exhaust. There are several methods reported to control heat transfer in heat transfer assemblies such as a pedestal for supporting a substrate including both a heating element and a cooling element which removes excess heat by circulating a cooling medium such as a gaseous or liquid coolant inside the pedestal or between the substrate and the pedestal When the substrate temperature increases beyond a set range during processes, the heating element is turned off, and the cooling element is activated to remove excess heat, thereby controlling the temperature. One or more parameters associated with this process may be used as input to digital replica 600 to determine how much excess heat is lost through exhaust.

In some embodiments, digital replica 600 may indicate energy flow and/or chemicals including lost precursors or by-products of reaction exiting an abatement or scrubber system. For example, gaseous effluent streams from the manufacturing of electronic materials, devices, products, solar cells and memory articles (hereinafter "electronic devices") may involve a wide variety of chemical compounds, organic compounds, oxidizers, breakdown products of photo-resist and other reagents, as well as other gases and suspended particulates that may be desirably removed from the effluent streams before the effluent streams are vented from a process facility into the atmosphere.

Effluent streams to be abated may include species generated by an electronic device manufacturing process and/or species that were delivered to the electronic device manufacturing process and which passed through the process chamber without chemical alteration. As used herein, the term "electronic device manufacturing process" is intended to be broadly construed to include any and all processing and unit operations in the manufacture of electronic devices, as well as all operations involving treatment or processing of materials used in or produced by an electronic device and/or LCD manufacturing facility, as well as all operations carried out in connection with the electronic device and/or LCD manufacturing facility not involving active manufacturing (examples include conditioning of process equipment, purging of chemical delivery lines in preparation of operation, etch cleaning of process tool chambers, abatement of toxic or hazardous gases from effluents produced by the electronic device and/or LCD manufacturing facility, etc.).

In some embodiments, the digital replica 600 accounts for exhaust flow of leaking gas or as a part of a cleaning procedure. For example, gases may be regularly flushed from manufacturing assets such as to increase the lifetime of the asset, improve the performance of the product, or prepare the product for a different function that is tasked to perform. The digital replica 600 may determine environmental consumption (e.g., energy consumption, gas consumption) associated with performing this purging procedure. For example, the digital replica 600 may indicate an energy and/or gas consumption used to flush a system (e.g., constantly provide gas flow to a system to maintain dynamic gas movement within the system). The digital replica 600 may indicate how energy and/or gas consumption is altered by adjusting one or more gas flow rates (e.g., purge gas) within the processing system.

In some embodiments, the digital replica 600 may leverage the process recipe and determine what gases are entering a processing chamber, what reactions are occurring on a substrate disposed within the processing chamber, what utilization of the gases occur with the substrate reactions, and so on. The digital replica 600 may further determine what gases and in what quantities remain after the reactions occur on the surface of the substrate. The digital replica 600 may further determine an amount and type of gases lost through abatement. The digital replica 600 may further determine what the end-byproduct of that is abated and the overall effect the end-byproduct has on the environment.

In some embodiments, one or more substrate processing procedures may demand consistent gas flow into and/or out of a processing chamber to process a substrate that meets target process result conditions. The substrate processing system may carry out a steady gas flow procedure by performing one or more flow-to-vent to flow-to-chamber transitions to reduce transient air flow from turning ON/OFF air flow to a chamber. For example, a first gas flow may be initialized and vented and once the gas flow has stabilized a steady flow of gas may be provided to a process chamber by directing the vented air into the chamber. The digital replica 600 may determine gas consumption as a result of this process (e.g., gas lost through venting). For example, the digital replica may identify transition time and a quantity of gas lost through venting the gas during a transient period of initializing or terminating flow of the gas. The digital replica may determine optimizations to the transition between venting of the gas and directing the gas into the chamber. Optimizing the transition time may reduce the gas lost through venting while identifying a time when the gas reaches a steady-state. In some embodiments, the transition cadence of the gas flow may be determine based on process results requirements. For example, a gas flow transition time may be determined (e.g., optimized) to include a flow rate that does not negatively impact a process result within a corresponding process chamber.

Digital replica 600 may be used for determining eco-efficiency data associated with one or more operational states of physical assets of a fabrication system. In an example, digital replica 600 may receive data associated with one or more operational state of physical assets of a fabrication system. For example, the digital replica 600 may receive reduced power data, sleep mode data, shared operational mode data, and/or process recipe data indicating one or more processing procedure performed by a fabrication system represented by digital replica 600.

Energy saving may occur when one or more physical assets operate at various operating states during operational time and idle time. For example, at different steps of the fabrication process, various elements of sub-fab equipment may not be necessary and so may be placed in a sleep, idle, hibernation, or off state, dependent upon how soon the elements are likely to be needed. Examples of power saving low power states include an idle state, a sleep state, and a hibernate state. The primary differences between the three power saving states are duration and energy consumption. Deeper levels of idle mode energy savings, such as sleep or hibernate, require longer periods of time to recover from energy savings modes to achieve full production without affecting the quality or yield of the fabrication process. Recovery of the process chambers and associated sub-fab equipment to best known method (BKM) temperatures and pressures can take seconds, minutes, or hours depending on the degree of deviation from BKM chamber conditions associated with the power saving state of the sub-fab equipment and process chamber. An idle state typically lasts for seconds, a sleep state typically lasts for minutes, and a hibernate state typically lasts for hours.

The digital replica 600 may identify one or more operational/power states of a physical asset of the manufacturing system and determine the effect of using that power state in a given scenario (e.g., system hardware architecture, sub-system hardware architecture, process one or more process recipes, performing certain scheduled processes, and the like). For example, the digital replica 600 may be part of a digital twin that determines the effect of such power states and scenarios for idle or full power or modulations before actually implementing the power adjustment(s) on the manufacturing system.

A process tool and associated manufacturing system may have a variety of different power configurations based upon operating needs. For example, power configurations may exist where the process tool is in an "off" state while various air flow and abatement systems are operating at full capacity to perform shut down operations after completing a fabrication operation. For the purposes of this application, the term "low power configuration" refers to any state where one or more elements of the process tool and/or manufacturing system sub-fabs are instructed by one or more controllers to operate in a power-savings mode, such as different levels of energy consumption during specific process recipe steps or non-production idle modes of operation such as idle, sleep, and hibernate states described above, or an off state.

In some embodiments, one or more support assets may provide support functionality to more than one other physical assets. For example, the pumping of two process chambers may be performed by a single pump. Leveraging a support asset to alternate operations between two physical assets may reduce energy and overall environmental cost.

The digital replica 600 may identify environmental resource consumption data associated with one or more physical assets operating in one or more corresponding operational modes. The digital replica 600 may provide recommendations for a reduction in environmental consumption costs by recommending one or more physical assets leverage a reduced power state, a sleep mode state a hibernate state, and/or a shared operation mode data during a period of the corresponding tool experiences an idle state or a state when the demands of the physical asset low.

In another example, digital replica 600 may be configured for determining eco-efficiency data associated with performing preventative maintenance (PM) and/or cleaning of a physical asset of a fabrication system. Digital replica 600 may receive purge gas data, cleaning process data, preventative maintenance data, chamber recovery data, and/or a process recipe to determine environmental resource consumption.

Substrate processing may include a series of processes that produces electrical circuits in a semiconductor, e.g., a silicon wafer, in accordance with a circuit design. These processes may be carried out in a series of chambers. Successful operation of a modern semiconductor fabrication facility may aim to facilitate a steady stream of wafers to be moved from one chamber to another in the course of forming electrical circuits in the wafer. In the process of performing many substrate procedures, conditions of processing chambers may depreciate and result in processed substrates failing to meet desired conditions or process results (e.g., critical dimensions, process uniformity, thickness dimensions, etc.).

Cleaning process data may indicate one or more parameters associated with a cleaning process such as a cleaning duration, frequency, and/or etchant flows. A cleaning process may utilize certain environmental resources such as cleaning material, precursors, etchants, and/or other substances leveraged to carry out a cleaning procedure. For example, a cleaning procedure may be performed at a cadence or frequency (e.g., after a quantity of processed wafers) for a process results of future substrate to meet threshold conditions (e.g., process uniformity, critical dimensions, etc.). The frequency of process chamber cleaning can be adjusted (e.g., optimized) to identify a cleaning frequency that still results of substrates processed by the chamber operating under this clean frequency schedule to meet a threshold condition (e.g., minimum process result requirements). For example, a multi-wafer cleaning procedure may be implemented that saves environmental resources such as cleaning materials, precursors, etchants, and/or other substances leveraged to carry out a cleaning procedure. The digital replica 600D may receive cleaning data and determine cleaning optimization such as updates to cleaning duration, frequency, quantity of cleaning agent used, etc.

Preventative maintenance data indicates one or more of a type, frequency, duration, etc. of one or more preventative maintenance procedures associated with one or more physical assets of a fabrication system. Preventative maintenance procedures (e.g., chamber cleaning) are often used as part of a chamber recovery process to return a state of the processing chamber into a state suitable for entering a substrate processing production mode (e.g., mass processing of substrates). A recovery procedure is often used subsequent to a preventative maintenance procedure to prepare a chamber for the production mode (e.g., "warm up" the chamber).

Chamber recovery data indicates one or more of a type, frequency, duration, etc. of one or more chamber recovery procedures associated with one or more physical assets of a fabrication system. A common recovery procedure conventionally employed is seasoning a processing chamber. Chamber seasoning is a procedure that includes processing a series of substrates (e.g., blank silicon wafers) to restore a chamber condition (e.g., coating the walls of the chamber) that is suitable for a production substrate process (e.g., substrates processed in the chamber having process results that meet desired threshold criteria). After chamber seasoning, a chamber may operate in a production mode for a period of time until another round of preventative maintenance and further chamber seasoning is needed or otherwise recommended to restore a state of the processing chamber.

Purge gas data may indicates a type, quantity, frequency flow rate, cleaning duration of a purge gas. The digital replica may determine effects of altering one or more operational parameters related to an employed purge gas. For example, the digital replica 600 may determine updates to environmental resource consumption based on switching to a purging procedure using alternative purge gas types such as $H_2$, $N_2$, clean dry air (CDA), and the like.

In another example, digital replica 600 may be configured for determining eco-efficiency data associated with one or more operational states of physical assets of a fabrication system. Digital replica 600 may receive coolant loop configuration data, process chilled water (PCW) data, ambient air data, and/or process recipe and determine environmental resource consumption data therefrom.

Process chambers utilized in substrate processing typically comprise a number of internal components that are repeatedly heated and cooled during and after processes are performed. In some instances, for example, when routine service or maintenance is needed after a process has been performed in a process chamber, the components are cooled to about room temperature. In temperature controlled components, for example, such as process chamber showerheads having coolants channels, to cool the component from a typical operating temperature (e.g. about 90 degrees Celsius), a heat source that heats the component may be shut off and a coolant is flowed through the coolant channels to extract heat from the component.

Coolant loop configuration data indicates one or more geometries of one or more coolant loops configures to extract heat from one or more physical assets of a fabrication system. The one or more coolant loops may operate in parallel having multiple loops cool common regions of physical assets. The one or more coolant loops may cool multiple physical assets in series on with another. Process chilled water (PCW) data indicates one or more parameters of a coolant substance such as a type, flow rate, temperature, of coolant (e.g., process chilled water (PCW). The digital replica may include heat flow model that indicates where energy is transferred within an environment of a fabrication system leveraging one or more coolant loops. The digital replica 600 may identify a modification of a physical asset (e.g., a chamber, chamber wall, chamber system) that directs heat to a cooling loop and associated eco-efficiency saved by directing the heat to the cooling loops. Digital replica 600 may further determine effects of process results as PCW modulation occurs. PCW modulation may involves altering a flow rate within a cooling loop to alter a heat exchange within a physical asset of the fabrication system.

Figure 7:
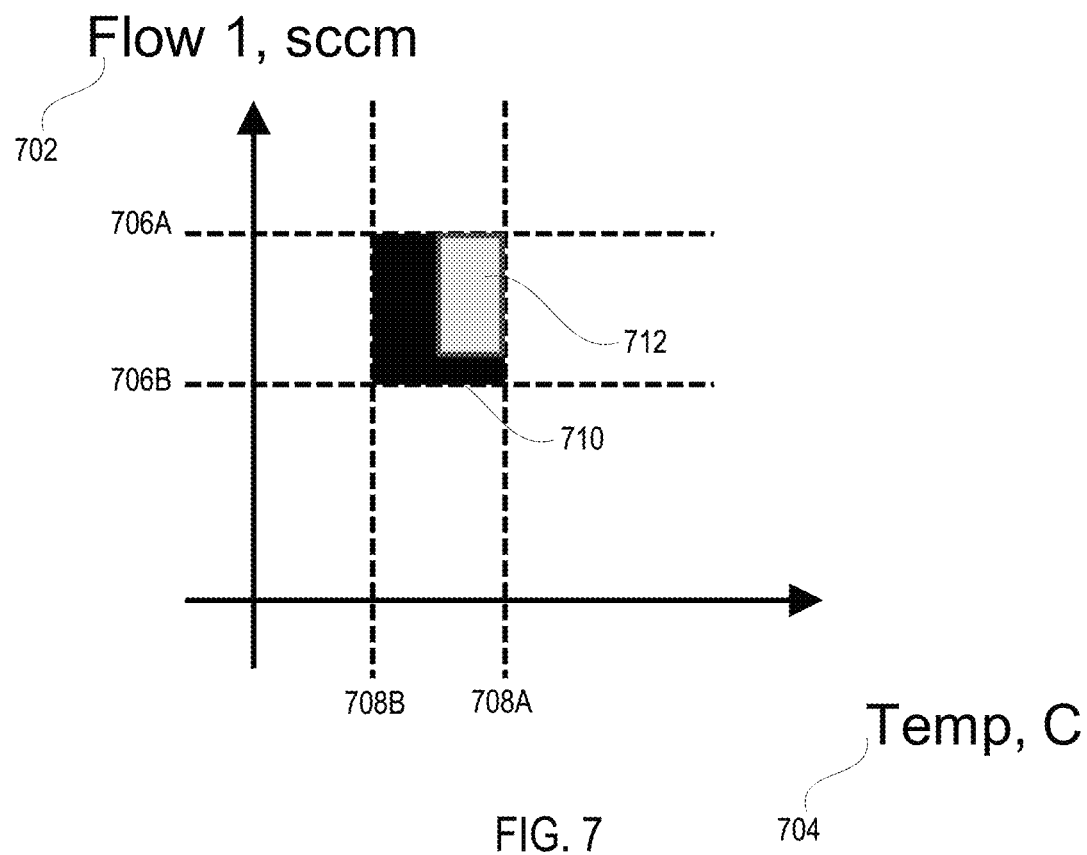
FIG. 7 is an exemplary illustration of a process parameter value window, in accordance with some implementation of the present disclosure.

FIG. 7 is an exemplary illustration of an operational parameter limitation 700 for a fabrication process step, in accordance with some implementation of the present disclosure. Various fabrication process steps may include operational parameter limitations 700 that indicate a process parameter window 710 or set of values (e.g., a combination of values) to a set of corresponding parameters that when satisfied attain a result that meets threshold condition (e.g., a minimum quality condition). For example, a process parameter window 710 may include a first parameter 702 (e.g., a first flow rate of a first gas) and a second parameter 704 (e.g., temperature of the gas). To perform a fabrication process and meet a threshold condition (e.g., minimum quality standard, statistical process control (SPC) limit, specification limitations, etc.), a process parameter window 710 is determined that identifies parameter value combinations that result in a product likely to meet the threshold condition. As shown in FIG. 7, the process parameter window 710 includes a lower limit 706B and a higher limit 706A to the first parameter 702 as well as a lower limit 708B and an upper limit 708A to the second parameter.

Optimizations identified by the manufacturing process system (e.g., using adaptive optimization algorithm 416 and/or physics based models 414) may include determining an eco-optimized process parameter window 712 within the process parameter window 710 that causes a manufacturing operation to consume a reduced amount of resources as compared to process parameter values outside of the eco-optimized process parameter window 712.

It should be noted that FIG. 7 depicts a simplified process parameter window 710 and eco-optimized process parameter window 712 dependent on only two parameters 702, 704. The process parameter window 710 and eco-optimized process parameter window 712 both form simple rectangles. A process parameter window may include more than two parameters and can include more diverse parameter dependencies. For example, a non-linear, physics based, statistical, and/or empirical relationship between parameters may cause non-linear process parameter windows and eco-optimized process parameter windows.

Figure 8:
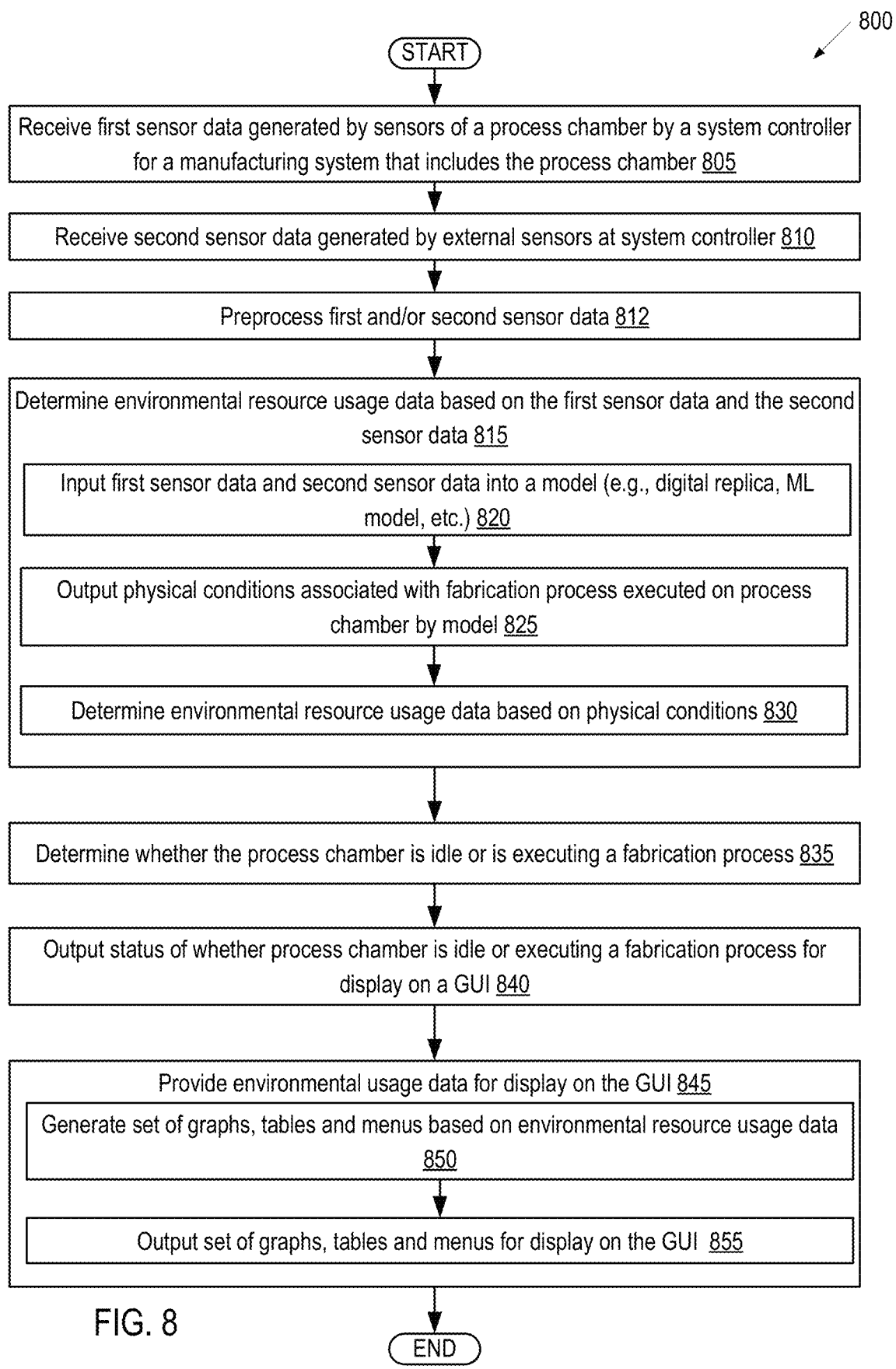
FIG. 8 is a flow diagram of a method for monitoring environmental usage data for a process chamber based on internal sensor data of the process chamber and external sensor data, in accordance with some implementations of the present disclosure.

FIG. 8 is a flow diagram of a method 800 for monitoring environmental usage data for a process chamber based on internal sensor data of the process chamber and external sensor data, in accordance with some implementations of the present disclosure. For simplicity of explanation, method 800 is depicted and described as a series of acts. However, acts in accordance with this disclosure can occur in various orders and/or concurrently and with other acts not presented and described herein. Furthermore, not all illustrated acts may be performed to implement method 800 in accordance with the disclosed subject matter. In addition, those skilled in the art will understand and appreciate that method 800 could alternatively be represented as a series of interrelated states via a state diagram or events. The method 800 may be performed by a processing logic that may comprise hardware (e.g., circuitry, dedicated logic, programmable logic, microcode, etc.), software (e.g., instructions run on a processing device to perform hardware simulation), or a combination thereof. In embodiments, method 800 may be performed by system controller 128 of FIG. 1 and/or by computing device 1000 of FIG. 10. Alternatively, method 800 may be performed by another device, such as computing device 250 of FIG. 2.

At block 805 of method 800, processing logic receives first sensor data generated by sensors of a process chamber. At block 810, processing logic receives second sensor data generated by external sensors such as IoT sensors (e.g., sensors that include embedded systems). At block 812, processing logic may preprocess some or all of the first sensor data and/or second sensor data. Such preprocessing may include any of the aforementioned preprocessing operations.

At block 815, processing logic determines environmental resource usage data based on the first sensor data and the second sensor data. This may include at block 820 inputting the first sensor data and the second sensor data into one or more model such as a digital replica, digital twin, physics-based model, statistical model and/or machine learning model. At block 825, the one or more model may output physical conditions associated with a fabrication process executed on the chamber model. At block 830, processing logic may determine environmental resource usage data based on the physical conditions and/or on the first and second sensor data. This may include putting the physical conditions, first sensor data and/or second sensor data into a second model (e.g., a machine learning model), which may output environmental resource usage data. In some embodiments, at block 825 the model(s) outputs the environmental resource usage data instead of or in addition to physical conditions associated with execution of the fabrication process.

At block 835, processing logic may determine whether the process chamber is idle or executing a fabrication process (e.g., the fabrication process for which environmental resource usage data is determined at block 815). At block 840, processing logic may output a status of whether the process chamber is idle or executing a fabrication process for the display on a GUI. In one embodiment, a pictorial representation of a manufacturing system comprising the process chamber is shown in the GUI. The pictorial representation may include icons for each of the process chambers of the manufacturing system. First visualizations (e.g., a first color such as red and/or a first texture and/or fill pattern) may be used for icons associated with idle process chambers, and second visualizations (e.g., a second color such as green and/or a second texture and/or fill pattern) may be used for icons associated with process chambers currently executing a process.

At block 845, processing logic may provide the environmental resource usage data for display on a GUI. As used herein, environmental resource usage data may include data on consumption of resources and/or chemicals, environmental impact of resource(s) and/or chemical(s) used/consumed, energy consumption, and/or environmental impact of energy consumed. The environmental resource usage data may be output in real time or near real time while the process is being performed in the process chamber, and may include current environmental resource usage (e.g., environment resource consumption, environmental impact of resource(s)/chemical(s) used, energy consumption, etc.) as well as environmental resource consumption accumulated thus far for the process under execution. Additionally, or alternatively, the environmental resource usage data may be output after the process has completed, and may show total environmental resource consumption for the process.

In one embodiment, at block 850 processing logic generates one or more sets of graphs, tables and/or menus based on the environmental resource usage data. At block 855, processing logic may output the set of graphs, tables and/or menus on the GUI.

FIGS. 9A-E illustrate various views of a consolidated environmental resource usage (e.g., environmental resource consumption, environmental impact of resource(s)/chemical(s) used, energy consumption, etc.) dashboard graphical user interface (GUI) 1000A-E, according to some embodiments.

Figure 9A:
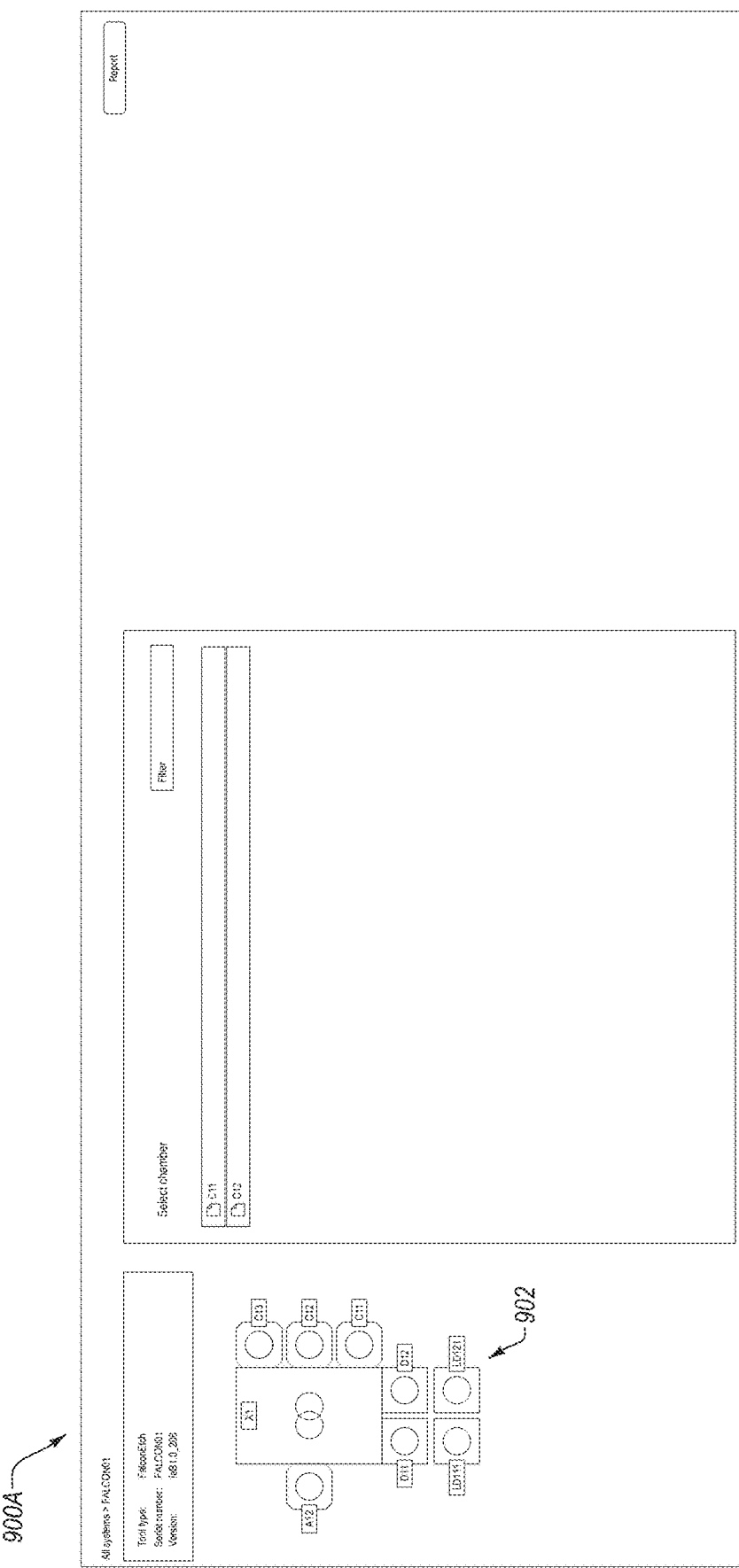
FIGS. 9A-E illustrate various views of a consolidated environmental resource consumption dashboard graphical user interface (GUI), according to some embodiments.

FIG. 9A illustrates a view 900A of an environmental resource usage (environmental impact of resource(s)/chemical(s) used, energy consumption, etc.) dashboard GUI. View 900A may be a landing page or main page for an eco-efficiency platform.

As shown in FIG. 9A, view 900A includes a system diagram 902. The system diagram 902 may include a schematic or mapping of one or more process chambers and/or other process tools. The system diagram 902 may be a live or dynamic image, and may indicate for each process chamber whether that process chamber is idle or active. Additionally, in embodiments basic environmental resource usage data such as total or average or current electrical consumption and/or gas consumption may be shown over or proximate to each tool icon. Above the system diagram 902 is a description of the manufacturing system, such as a tool type, serial number, manufacturing system name, and/or version number.

To the right of the system diagram 902 is a menu of components or tools (e.g., including process chambers) of the manufacturing system. Any of the components or tools in the menu may be selected to bring up further views showing environmental resource usage data for the selected tool or tools. As shown, A12, and C11, C12 and C13 are all process chambers. X1 is a transfer chamber. D11, D12, LD111 and LD 121 are load locks, and FI is a factory interface.

A report button is also shown in the upper right hand corner of the GUI. A user may click on or select the report button to generate a report on the environmental resource usage of the manufacturing system. The report may include, for example, electrical consumption for a period, a detailed table of gas consumption for the period, and so on.

Figure 9B:
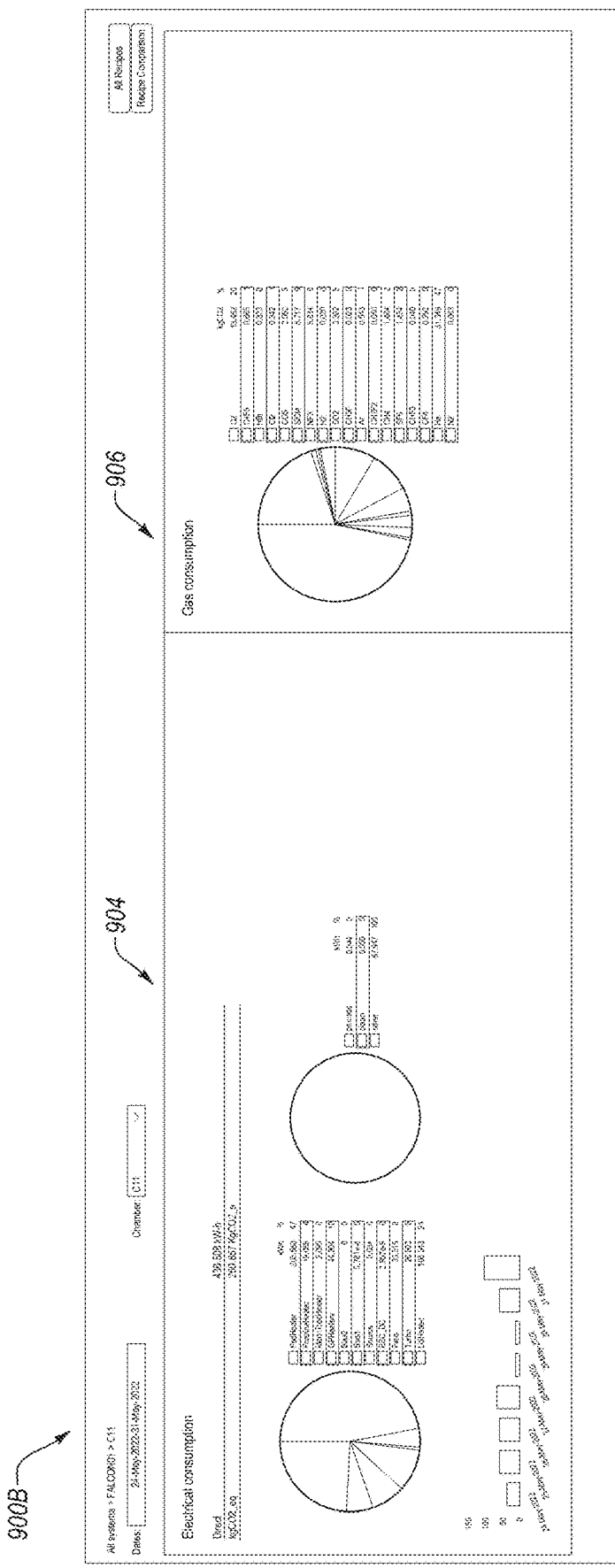

FIG. 9B illustrates a second view 900B of the environmental resource usage dashboard GUI. The second view 900B may be shown after the user selects one of the tools (e.g., process chamber C11). The second view 900B shows a date range for a breakdown of environmental resource usage data that is illustrated. In one embodiment, the second view 900B includes an electrical consumption breakdown 904 and a gas consumption breakdown 906. The electrical consumption breakdown 904 indicates one or more electrical consumption contributions of sub-components of the identified system. The sub-components may include items such as pumps, power supplies, HVAC, gas flow, heater, coolers, and so on.

The chemical consumption breakdown 906 (e.g., breakdown of used gases, liquids, solids, etc.) is analogous to the electrical consumption breakdown 904 and provides a chemical consumption or loss attributed to one or more sub-components of the identified system. The consumed chemicals may include one or more gas, liquid, and/or solid. For example, some precursors for processes are gaseous, while other precursors may be liquids that are converted to a vapor and/or gaseous state through bubblers or injection or atomization processes before being injected into a process chamber. The view 900B may include a temporally distributed representation of the electrical consumption of the system and/or the gas consumption of the system. For example, a 7-day electrical consumption history may be depicted. In one embodiment, the electrical consumption and gas consumption are shown in one or more pie charts.

View 900B shows an "all recipes" button and a "recipe comparison" button in the upper right hand region of the GUI. Selecting the recipe comparison button may bring up the view shown in FIG. 9E. Selection of the "all recipes" button may bring up the view shown in FIG. 9D.

View 900B shows a date window and a chamber window. A user may select the chamber window to bring up a drop down menu from which any tool (e.g., process chamber) may be selected. Second view 900B would then be updated responsive to selection of a new tool by replacing the environmental resource data associated with the previously selected tool with new environmental resource data associated with the selected tool. Selection of the date window brings up the view shown in FIG. 9C.

In some embodiments, the environmental resource usage dashboard GUI includes an interface (e.g., buttons, drop-down menus, text input boxes, etc.) for invoking, applying and/or using one or more models, such as the trained machine learning models and/or physics-based models described herein. For example, the environmental resource usage dashboard GUI may enable a user to interact with, enter, select, etc. input information (e.g., via a drop down menu, text input window, date selection window, etc.) to be processed by a model (e.g., physics-based model and/or trained machine learning model). The environmental resource usage dashboard GUI may further enable a user to select a particular model or set of models (e.g., via a dropdown menu). The environmental resource usage dashboard GUI may then present outputs of the one or more models to a display. The outputs may include any of the outputs discussed herein above, for example. Based on such outputs, a user may interface with the environmental resource usage dashboard GUI to perform actions such as schedule a maintenance, modify a recipe, and so on.

Figure 9C:
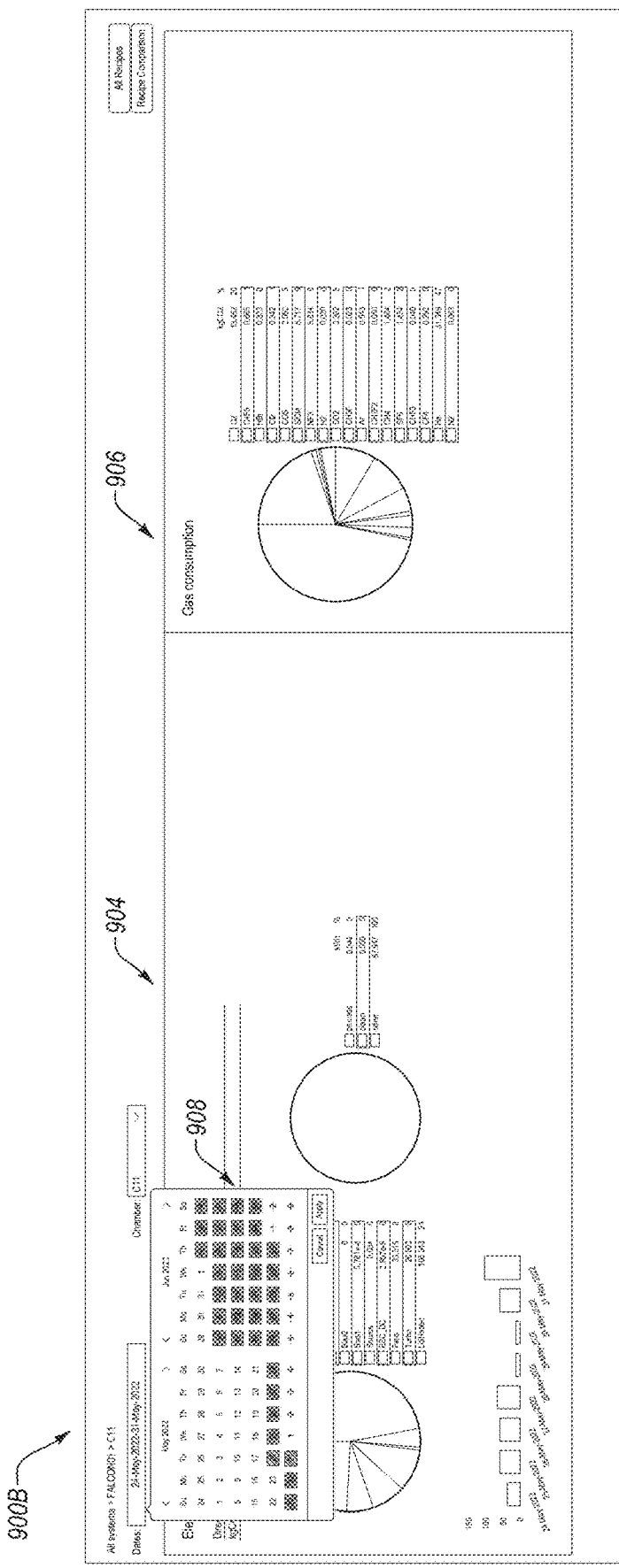

FIG. 9C illustrates second view 900B with a popup window 908 overlaid on top of the second view 900B. The popup window 908 includes a calendar from which a user may select start and end dates for environmental resource usage data.

Figure 9D:
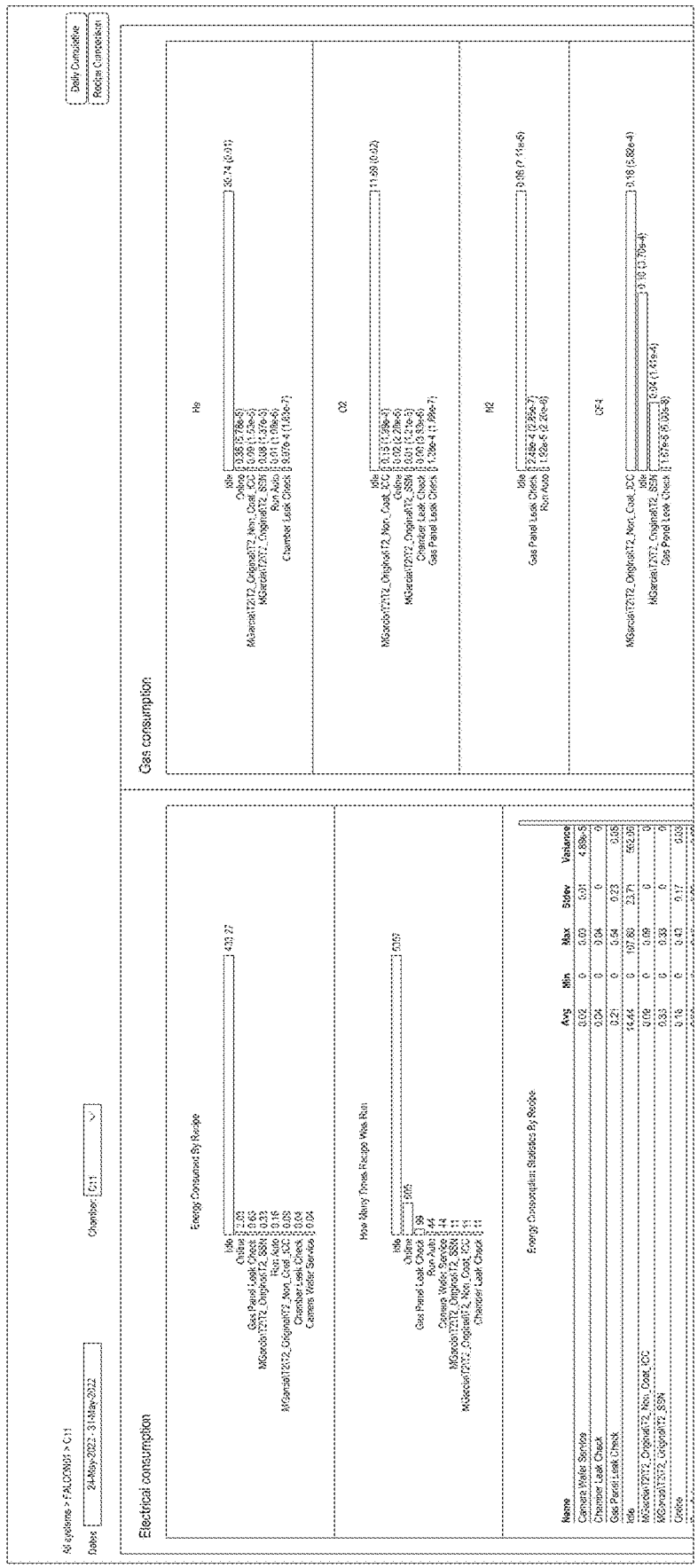

FIG. 9D illustrates a third view 900C of the GUI. In the third view 900C, a per-recipe electrical consumption, gas consumption, etc. may be shown. The per-recipe electrical consumption may indicate an electricity cost attributed to running one or more identified process recipes. The per-recipe electrical consumption may further indicate one or more quantities indicating a number of times a corresponding recipe is performed. The per-recipe gas consumption may indicate a gas usage or gas loss attributed to running one or more identified process recipes. The per-recipe gas consumption may further indicate one or more quantities indicating a number of times a corresponding recipe is performed. As shown in FIG. 9D, the GUI may include a navigation panel (e.g., interactable buttons) that allows a user to access a different views of the GUI (e.g., with a different representation of eco-efficiency data).

Figure 9E:
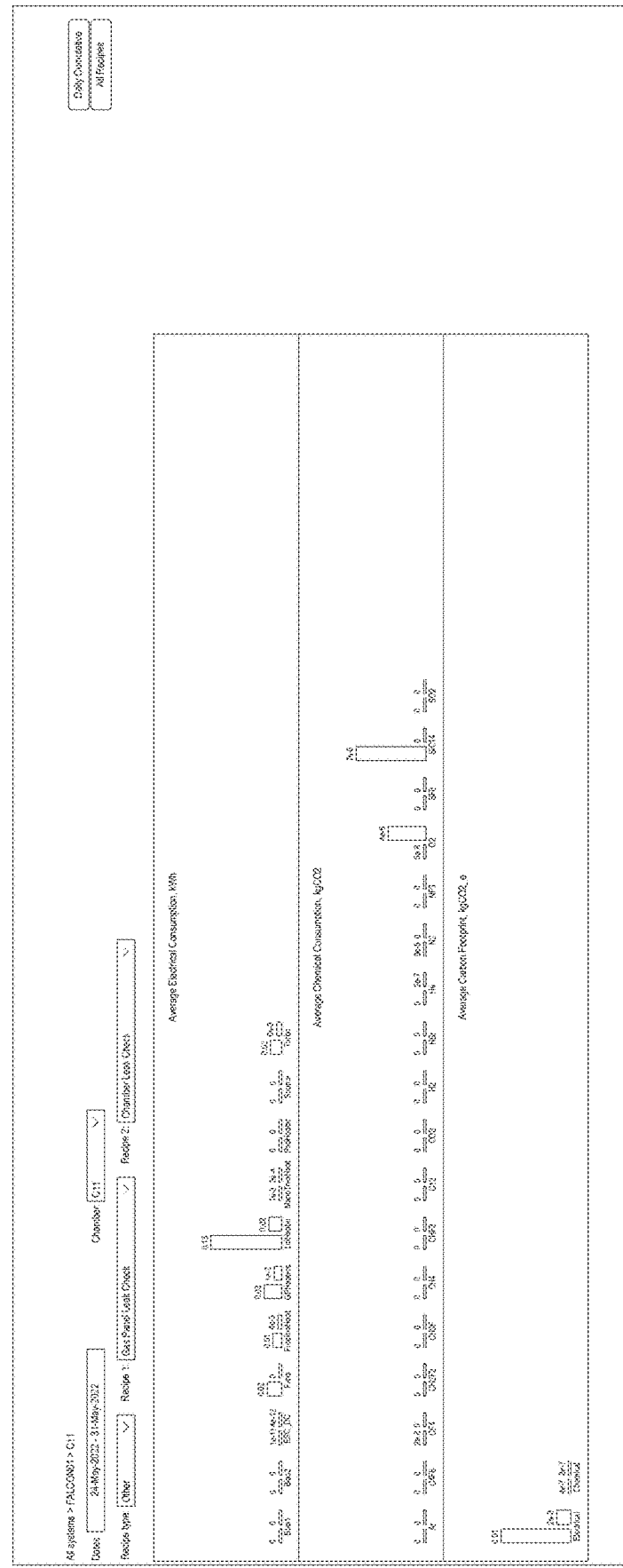

FIG. 9E illustrates a recipe comparison view 900D of a consolidated environmental resource consumption dashboard GUI. As shown in FIG. 9E, view 900D shows comparisons of electrical consumption, chemical consumption and carbon footprint for two selected recipes over a date range. A user may select a first recipe and a second recipe be compare via recipe windows, may choose a recipe type via a recipe type window, may choose a chamber or tool under a chamber window, and may choose a date range for comparison under a date window. Types of recipes include clean recipes, service recipes, deposition recipes, etch recipes, and so on.

Figure 10:
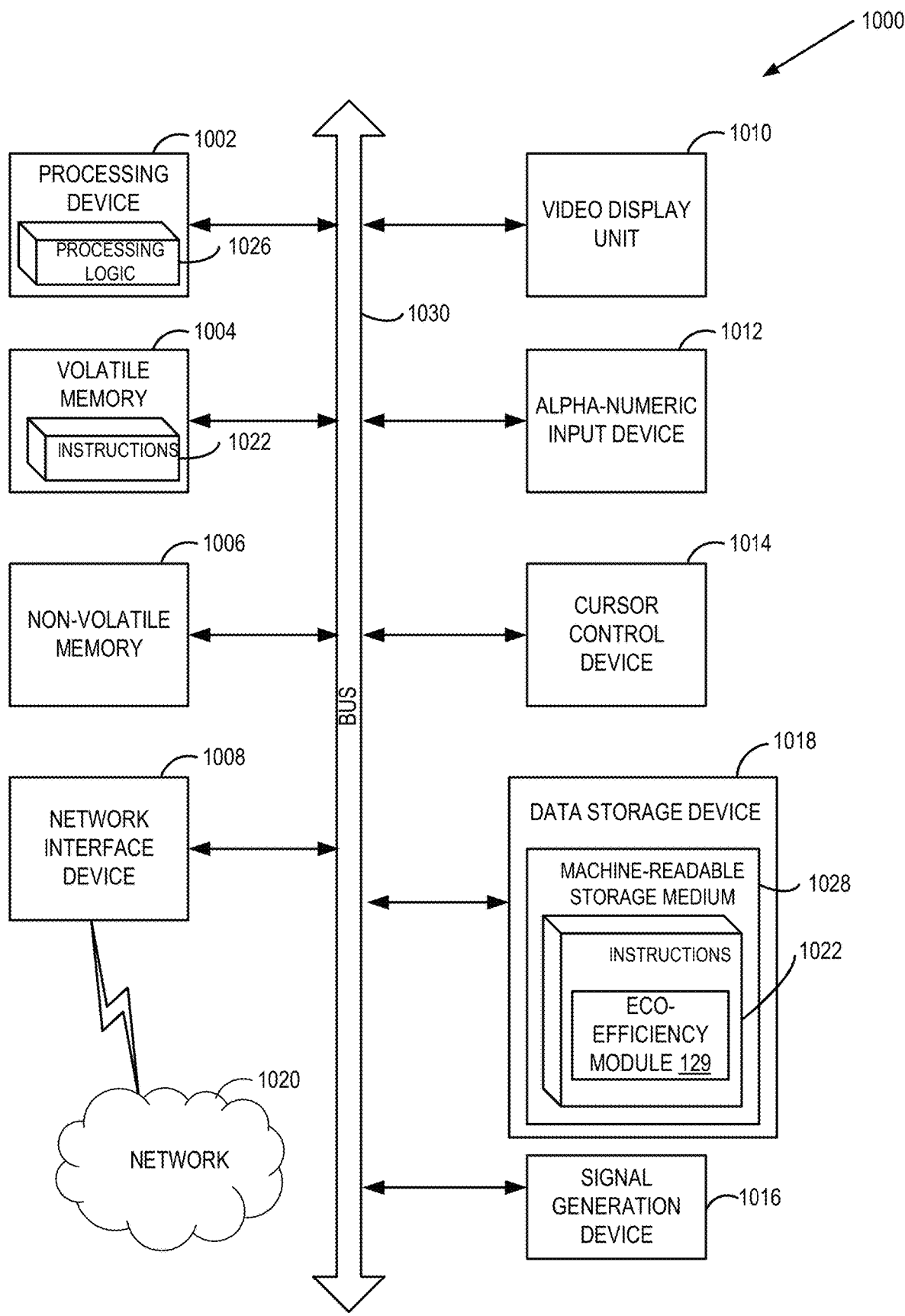
FIG. 10 depicts a block diagram of an example computing device, operating in accordance with one or more aspects of the present disclosure.

FIG. 10 depicts a block diagram of an example computing device, operating in accordance with one or more aspects of the present disclosure. In various illustrative examples, various components of the computing device 1000 may represent various components of the system controller 128, computing device 250, device executing web client 220, and so on.

Example computing device 1000 may be connected to other computer devices in a LAN, an intranet, an extranet, and/or the Internet (e.g., using a cloud environment, cloud technology, and/or edge computing). Computing device 1000 may operate in the capacity of a server in a client-server network environment. Computing device 1000 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 1000 may include a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 800 illustrated in FIG. 8.

Example computing device 1000 may further comprise a network interface device 1008, which may be communicatively coupled to a network 1020. Example computing device 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a machine-readable storage medium (or, more specifically, a non-transitory machine-readable storage medium) 1028 on which is stored one or more sets of executable instructions 1022. For example the data storage may be physical storage on-premise or remote such as a cloud storage environment. In accordance with one or more aspects of the present disclosure, executable instructions 1022 may comprise executable instructions associated with executing method 800 of FIG. 8. In one embodiment, instructions 1022 include instructions for eco-efficiency module 129 of FIG. 1.

Executable instructions 1022 may also reside, completely or at least partially, within main memory 1004 and/or within processing device 1002 during execution thereof by example computing device 1000, main memory 1004 and processing device 1002 also constituting computer-readable storage media. Executable instructions 1022 may further be transmitted or received over a network via network interface device 1008.

While the computer-readable storage medium 1028 is shown in FIG. 10 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "determining," "storing," "adjusting," "causing," "receiving," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, compact disc read only memory (CD-ROMs), and magnetic-optical disks, read-only memories (ROMs), random access memories (RAMs), erasable programmable read-only memory (EPROMs), electrically erasable programmable read-only memory (EEPROMs), magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   receiving, by a processing device, first sensor data generated by a plurality of sensors of a process chamber of a manufacturing system during execution of a fabrication process;

receiving, by the processing device, second sensor data generated by one or more external sensors that are not components of the process chamber during execution of the fabrication process;

preprocessing, by the processing device, the first sensor data and the second sensor data, the preprocessing comprising at least one of labeling, synchronizing based on timestamps, normalizing, or changing units of measurement;

determining, by the processing device, environmental resource usage data indicative of an environmental resource consumption of the fabrication process run on the process chamber based on the preprocessed first sensor data and the preprocessed second sensor data;

generating, by the processing device, a recommendation to modify at least one operational parameter of the manufacturing system to reduce environmental resource consumption based on the environmental resource usage data;

implementing, by the processing device, the recommendation by adjusting the at least one operational parameter of the manufacturing system, wherein the manufacturing system uses the at least one operational parameter to improve an ecoefficiency of the manufacturing system; and providing, by the processing device, the environmental resource usage data and the implemented recommendation for display on a graphical user interface (GUI).

2. The method of claim 1, wherein determining the environmental resource usage data comprises:
inputting the first sensor data and the second sensor data into a trained model that outputs the environmental resource usage data.

3. The method of claim 2, wherein determining the environmental resource usage data comprises:
inputting the first sensor data and the second sensor data into a digital replica of the process chamber, wherein the digital replica outputs physical conditions associated with the fabrication process; and
determining the environmental resource usage data based at least in part on the physical conditions associated with the fabrication process.

4. The method of claim 3, wherein the digital replica comprises a physics-based model of one or more physical assets of the manufacturing system, wherein the physics-based model indicates:
one or more gases that enter the process chamber;
one or more reactions occurring on a substrate disposed within the process chamber; and
one or more relationships between the one or more gases and the one or more reactions occurring on the substrate.

5. The method of claim 1, wherein the environmental resource usage data comprises at least one of an energy consumption, a gas consumption, a carbon footprint, or a water consumption associated with the process chamber performing the fabrication process.

6. The method of claim 1, wherein:
the first sensor data comprises measurements of at least one of current, voltage, power, flow, pressure, concentration, speed, acceleration, or temperature; and
the second sensor data comprises measurements of at least one of current, flow, temperature, eddy current, concentration, vibration, voltage, or power factor.

7. The method of claim 1, wherein the one or more external sensors comprise internet-of-things (IoT) sensors that provide the second sensor data to an IoT hub, and wherein the second sensor data is received by the processing device from the IoT hub.

8. The method of claim 1, wherein the processing device is a processing device of the manufacturing system, wherein the one or more external sensors comprise internet-of-things (IoT) sensors that provide the second sensor data to an IoT hub, wherein the IoT hub transmits the second sensor data to a remote computing device connected to the IoT hub via a network, and wherein the processing device receives the second sensor data from the remote computing device.

9. The method of claim 1, further comprising:
generating a set of graphs, tables and menus based on the environmental resource usage data;
displaying the set of graphs, tables and menus via the GUI.

10. The method of claim 1, further comprising:
determining whether the process chamber is idle or is executing the fabrication process or an alternate fabrication process; and
displaying a representation of the manufacturing system via the GUI, the representation of the manufacturing system comprising a representation of the process chamber, wherein the representation of the process chamber comprises a first visualization when the process chamber is idle and a second visualization when the process chamber is executing the fabrication process or the alternate fabrication process.

11. The method of claim 1, further comprising:
preprocessing the first sensor data and the second sensor data prior to determining the environmental resource usage data based on the first sensor data and the second sensor data, wherein preprocessing the first sensor data and the second sensor data comprises at least one of a) labeling at least one of the first sensor data or the second sensor data, b) syncing at least one of the first sensor data or the second sensor data based on timestamps, c) normalizing at least one of the first sensor data or the second sensor data, or d) changing units of measurement for one or more measurements of at least one of the first sensor data or the second sensor data.

12. The method of claim 1, further comprising:
using at least one of the environmental resource usage data or a recipe used for the fabrication process as input to a trained machine learning model; and
obtaining one or more outputs of the trained machine learning model, the one or more outputs indicating a modification to the fabrication process that reduces the environmental resource consumption of the fabrication process run on the process chamber.

13. The method of claim 1, wherein the first sensor data and the second sensor data is received in parallel.

14. The method of claim 1, further comprising:
inputting, by the processing device, the preprocessed first sensor data and the preprocessed second sensor data into a digital twin of at least a portion of the manufacturing system, wherein the digital twin comprises a physics-based model of one or more physical assets of the manufacturing system; and
simulating, by the processing device, the execution of the fabrication process within the digital twin to estimate physical conditions and environmental resource consumption associated with the process;
wherein the recommendation to modify at least one operational parameter is generated based at least in part on outputs from the digital twin simulation, the outputs comprising predicted environmental resource usage and predicted effects of operational parameter adjustments on ecoefficiency.

15. A system, comprising:
a manufacturing system, comprising:
one or more process chambers to process substrates, the one or more process chambers comprising a first plurality of sensors;
a transfer chamber coupled to the one or more process chambers, the transfer chamber comprising a robot for transferring the substrates to and from the one or more process chambers; and
a system controller to control the one or more process chambers and the transfer chamber; and
a second plurality of sensors, wherein the second plurality of sensors are external sensors that are not components of any of the one or more process chambers; and
a hub that communicates with the second plurality of sensors;
wherein the system controller is to:
receive first sensor data generated by the first plurality of sensors during execution of a fabrication process on a first process chamber of the one or more process chambers;
receive second sensor data generated by the second plurality of sensors that are associated with the first process chamber;
preprocess the first sensor data and the second sensor data, the preprocessing comprising at least one of labeling, synchronizing based on timestamps, normalizing, or changing units of measurement;
determine environmental resource usage data indicative of an environmental resource consumption of the fabrication process run on the first process chamber based on applying the first sensor data and the second sensor data to one or more model;
generate a recommendation to modify at least one operational parameter of the manufacturing system to reduce environmental resource consumption based on the environmental resource usage data;
implement the recommendation by adjusting the at least one operational parameter of the manufacturing system, wherein the manufacturing system uses the at least one operational parameter to improve an ecoefficiency of the manufacturing system; and provide the environmental resource usage data and the implemented recommendation for display on a graphical user interface (GUI).

16. The system of claim 15, wherein the one or more model comprises a digital replica of a process chamber of the one or more process chambers, and wherein determining the environmental resource usage data comprises:
inputting the first sensor data and the second sensor data into the digital replica of the process chamber, wherein the digital replica outputs physical conditions associated with the fabrication process; and
determining the environmental resource usage data based at least in part on the physical conditions associated with the fabrication process.

17. The system of claim 15, wherein:
the environmental resource usage data comprises at least one of an energy consumption, a gas consumption, a carbon footprint, or a water consumption associated with the first process chamber performing the fabrication process;
the first sensor data comprises measurements of at least one of current, voltage, power, flow, pressure, concentration, speed, acceleration, or temperature; and
the second sensor data comprises measurements of at least one of current, flow, temperature, eddy current, concentration, vibration, voltage, or power factor.

18. The system of claim 15, wherein the hub comprises an internet-of-things (IoT) hub that wirelessly receives the second sensor data from the second plurality of sensors, and wherein the second plurality of sensors comprise IoT sensors.

19. The system of claim 15, further comprising:
a remote computing device to:
receive the environmental resource usage data from the system controller;
store the environmental resource usage data to a database; and
output the environmental resource usage data to the GUI.

20. A non-transitory machine-readable storage medium comprising instructions that, when executed by a processing device, cause the processing device to:
receive, by the processing device, first sensor data generated by a plurality of sensors of a process chamber of a manufacturing system during execution of a fabrication process;
receive, by the processing device, second sensor data generated by one or more external sensors that are not components of the process chamber during execution of the fabrication process;
preprocess, by the processing device, the first sensor data and the second sensor data, the preprocessing comprising at least one of labeling, synchronizing based on timestamps, normalizing, or changing units of measurement;
determine, by the processing device, environmental resource usage data indicative of an environmental resource consumption of the fabrication process run on the process chamber based on the first sensor data and the second sensor data; and
generate, by the processing device, a recommendation to modify at least one operational parameter of the manufacturing system to reduce environmental resource consumption based on the environmental resource usage data;
implement, by the processing device, the recommendation by adjusting the at least one operational parameter of the manufacturing system, wherein the manufacturing system uses the at least one operational parameter to improve an ecoefficiency of the manufacturing system; and
provide, by the processing device, the environmental resource usage data and the implemented recommendation for display on a graphical user interface (GUI).

21. The non-transitory machine-readable storage medium of claim 20, wherein determining the environmental resource usage data comprises:
inputting the first sensor data and the second sensor data into a trained model that outputs the environmental resource usage data.

* * * * *